US007862214B2

(12) United States Patent
Trott et al.

(10) Patent No.: US 7,862,214 B2
(45) Date of Patent: Jan. 4, 2011

(54) LIGHTING DEVICES AND METHODS OF INSTALLING LIGHT ENGINE HOUSINGS AND/OR TRIM ELEMENTS IN LIGHTING DEVICE HOUSINGS

(75) Inventors: Gary David Trott, Morrisville, NC (US); Paul Kenneth Pickard, Morrisville, NC (US)

(73) Assignee: Cree, Inc., Durham, NC (US)

(*) Notice: Subject to any disclaimer, the term of this patent is extended or adjusted under 35 U.S.C. 154(b) by 271 days.

(21) Appl. No.: 11/877,038

(22) Filed: Oct. 23, 2007

(65) Prior Publication Data

US 2008/0106907 A1 May 8, 2008

Related U.S. Application Data

(60) Provisional application No. 60/853,589, filed on Oct. 23, 2006.

(51) Int. Cl.

| | |
|---|---|
| ***F21V 15/00*** | (2006.01) |
| ***F21V 17/00*** | (2006.01) |
| ***B60Q 1/06*** | (2006.01) |
| ***F21S 8/00*** | (2006.01) |
| ***A47K 1/08*** | (2006.01) |
| ***A47F 5/00*** | (2006.01) |
| ***A47G 1/10*** | (2006.01) |

(52) U.S. Cl. ........................ 362/365; 362/366; 362/371; 362/147; 248/312.1; 248/314; 248/316.7

(58) Field of Classification Search ......... 362/364–366, 362/371, 147, 148; 248/312.1, 314, 316.7
See application file for complete search history.

(56) References Cited

U.S. PATENT DOCUMENTS 4,313,154 A * 1/1982 Capostagno et al. ........ 362/365
5,440,471 A * 8/1995 Zadeh ........................ 362/365

(Continued)

FOREIGN PATENT DOCUMENTS

DE 297 06 402 9/1997

(Continued)

OTHER PUBLICATIONS

U.S. Appl. No. 11/613,692, filed Dec. 20, 2006.

(Continued)

*Primary Examiner*—Jong-Suk (James) Lee
*Assistant Examiner*—David J Makiya
(74) *Attorney, Agent, or Firm*—Burr & Brown

(57) ABSTRACT

A lighting device, comprising a housing and at least one mounting clip. The housing comprises an electrical connection region engageable in an electrical receptacle. The mounting clip is pivotable from a first position, where an end region of the mounting clip does not extend beyond a periphery of the housing, to a second position, where the end region extends beyond the housing periphery. Also, a lighting device, comprising a housing, a trim element and at least one mounting clip. The mounting clip is pivotable, such that if the mounting clip is in a second position and then the trim element is rotated, the mounting clip will pivot to a third position, where the mounting clip engages the housing such that the trim element is biased toward a ceiling or other structure in which the lighting device is mounted. Also, methods of installing housings and/or trim elements.

56 Claims, 8 Drawing Sheets

U.S. PATENT DOCUMENTS

| | | | | |
|---|---|---|---|---|
| 5,707,143 | A * | 1/1998 | Hentz | 362/365 |
| 5,826,970 | A * | 10/1998 | Keller et al. | 362/147 |
| 5,836,677 | A | 11/1998 | Connors et al. | |
| 6,361,193 | B1 * | 3/2002 | Gabrius et al. | 362/365 |
| 6,979,108 | B1 * | 12/2005 | Berge | 362/442 |
| 2006/0091272 | A1 * | 5/2006 | Piel et al. | 248/231.9 |
| 2007/0019418 | A1 * | 1/2007 | Czech et al. | 362/364 |
| 2008/0219001 | A1 * | 9/2008 | Russell | 362/246 |

FOREIGN PATENT DOCUMENTS

WO 2004/023424 3/2004

OTHER PUBLICATIONS

U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/626,483, filed Jan. 24, 2007.
U.S. Appl. No. 11/743,754, filed May 3, 2007.
U.S. Appl. No. 11/751,982, filed May 22, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/755,153, filed May 30, 2007.
U.S. Appl. No. 11/755,162, filed May 30, 2007.
U.S. Appl. No. 11/856,421, filed Sep. 17, 2007.
U.S. Appl. No. 11/854,744, filed Sep. 13, 2007.
U.S. Appl. No. 11/859,048, filed Sep. 21, 2007.
U.S. Appl. No. 11/936,163, filed Nov. 7, 2007.
U.S. Appl. No. 11/843,243, filed Aug. 22, 2007.
U.S. Appl. No. 11/939,052, filed Nov. 13, 2007.
U.S. Appl. No. 11/753,103, filed May 24, 2007.
U.S. Appl. No. 11/948,021, filed Nov. 30, 2007.
U.S. Appl. No. 11/870,679, filed Oct. 11, 2007.
U.S. Appl. No. 11/951,626, filed Dec. 6, 2007.
U.S. Appl. No. 11/948,041, filed Nov. 30, 2007.
U.S. Appl. No. 12/035,604, filed Feb. 22, 2008.
U.S. Appl. No. 11 939,059, filed Nov. 13, 2007.

* cited by examiner

LIGHTING DEVICES AND METHODS OF INSTALLING LIGHT ENGINE HOUSINGS AND/OR TRIM ELEMENTS IN LIGHTING DEVICE HOUSINGS

CROSS-REFERENCE TO RELATED APPLICATIONS

This application claims the benefit of U.S. Provisional Patent Application No. 60/853,589, filed Oct. 23, 2006, the entirety of which is incorporated herein by reference.

FIELD OF THE INVENTION(S)

The present inventive subject matter relates to lighting devices which in some aspects include at least one pivotable mounting clip for holding a light engine housing or a trim element in place relative to a lighting device housing. The present inventive subject matter also relates to methods of installing a light engine housing in a lighting device housing, and methods of installing a trim element in a lighting device housing.

BACKGROUND OF THE INVENTION(S)

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (1 m/W), and/or duration of service.

In addition, there is an ongoing need to make lighting devices, including lighting devices comprising conventional light emitters (e.g., incandescent light bulbs, fluorescent light bulbs, etc) and/or solid state light emitters, in which the components of the lighting devices are held together more securely, in which the lighting device dissipates heat more effectively, and/or which are more energy efficient.

BRIEF SUMMARY OF THE INVENTION(S)

In accordance with one aspect of the present inventive subject matter, it would be desirable to provide structure which retains a light engine and/or a trim assembly within any of a variety of recessed downlight housings (or, for that matter, any lighting device housings), and to be able, in such structure, to accommodate any of a variety of housings available from a variety of sources, such housings having a variety of housing diameters (and other dimensions), a variety of obstructions, etc. (and some of which include Edison sockets rigidly attached to moveable bases, while others have sockets that are loosely attached inside the housing and are provided mechanical attachment on the trim). It would be desirable to provide devices which could accommodate a wide range of housing diameters and which could work with loosely or rigidly mounted sockets. Further, it would be desirable to provide such features with structure that would be simple, easy to use and inexpensive.

In accordance with another aspect of the present inventive subject matter, it would be desirable to provide structure which would reduce or eliminate the tendency for trim sagging—that is, it was recognized that so-called "trim" elements of many conventional devices have a tendency to sag to a slight degree (i.e., it is common for trim elements to sag 1/16" to 1/4" when installed with friction clips).

In accordance with the present inventive subject matter, there is provided a clip which is rotated (as discussed herein in more detail) to decrease resistance while sliding the light engine and/or trim into a housing, and which locks into place when twisted.

In some embodiments of the present inventive subject matter, described in more detail herein, there is provided a spring-steel retention clip which is mounted to the top of the trim or the light engine housing and which rotates for ideal function for shipment, sliding into the housing, locking into position, or removal. In some such embodiments, the clips may be rotated so that they are inside the outer diameter of the trim or the light engine housing to minimize likelihood of damage during shipment. Such embodiments allow the assembly to be easily installed in housings with fixed Edison sockets. In some such embodiments:

- before installation, the clips are to be rotated into a minimally engaged position on top of a boss or other raised portion of the trim or light engine housing;
- the angle with respect to a perpendicular from the tangent to the edge of the trim should be sufficient to allow the clip to contact the housing as it is being pushed into the housing with minimal resistance;
- once the bottom of the trim is flush with the ceiling, the installer twists the trim, causing the trim to lock into final state condition with motion halted by another stop;
- in this fully-deployed condition, the clips are perpendicular to the tangent of the trim and the ends of the clips dig into the housing and apply additional upward force to the trim, eliminating the chance for the trim and/or light engine sagging;
- to remove the assembly, the installer pulls the housing down enough to clear the stop and rotates in the opposite direction to remove pressure and remove.

According to a first aspect of the present inventive subject matter, there is provided a lighting device, comprising a light engine housing and at least a first mounting clip.

In this first aspect of the present inventive subject matter, the light engine housing comprises an electrical connection region which is engageable in an electrical receptacle.

In addition, in this first aspect of the present inventive subject matter, the first mounting clip is mounted pivotally about a first pivot axis on a mounting clip surface of the light engine housing and it has a first mounting clip first end region which is spaced from the first pivot axis. The first mounting clip is pivotable about the first pivot axis at least from a first mounting clip first position, where the first mounting clip first end region does not extend beyond a periphery of the light engine housing, to a first mounting clip second position, where the first mounting clip first end region extends beyond a periphery of the light engine housing.

According to a second aspect of the present inventive subject matter, there is provided a lighting device, comprising a lighting device housing, a trim element and at least a first mounting clip.

In this second aspect of the present inventive subject matter, the lighting device housing comprises an electrical receptacle and a sidewall having an internal surface which defines an internal space, the sidewall terminating in a sidewall end region.

In addition, in this second aspect of the present inventive subject matter, the trim element comprises at least first and second portions, the first portion of the trim element being positioned within the internal space, the second portion of the trim element extending beyond the internal space, the second portion of the trim element comprising a second portion end region which is positioned farther from an axis of the internal surface than the sidewall end region.

In addition, in this second aspect of the present inventive subject matter, the first mounting clip is mounted pivotally about a first pivot axis on the trim element, the first mounting clip having a first mounting clip first end region, the first mounting clip first end region being spaced from the first pivot axis. The first mounting clip is pivotable about the first pivot axis at least from a first mounting clip first position, where the first mounting clip first end region does not extend beyond a periphery of the first portion of the trim element, to a first mounting clip second position, where the first mounting clip first end region extends beyond a periphery of the first portion of the trim element, such that if the first mounting clip is in the first mounting clip second position and then the trim element is rotated in a first direction about the axis of the internal surface, as a result of contact between the first mounting clip first end region and the lighting device housing, the first mounting clip will pivot relative to the first pivot axis to a first mounting clip third position, where the first mounting clip engages the lighting device housing such that the trim element is biased in a direction in which the second portion of the trim element is biased toward the sidewall end region.

According to a third aspect of the present inventive subject matter, there is provided a lighting device comprising a light engine housing, at least a first mounting clip and a lighting device housing.

In this third aspect of the present inventive subject matter, the light engine housing comprises an electrical connection region which is engageable in an electrical receptacle;

In addition, in this third aspect of the present inventive subject matter, the first mounting clip is mounted pivotally about a first pivot axis on a mounting clip surface of the light engine housing, the first mounting clip having a first mounting clip first end region, the first mounting clip first end region being spaced from the first pivot axis.

In addition, in this third aspect of the present inventive subject matter, the lighting device housing comprises a sidewall having an internal surface, the sidewall terminating in a sidewall end region.

In addition, in this third aspect of the present inventive subject matter, the first mounting clip is pivotable about the first pivot axis at least from a first mounting clip first position, where the first mounting clip first end region does not extend beyond a periphery of the light engine housing, to a first mounting clip second position, where the first mounting clip first end region extends beyond a periphery of the light engine housing, such that if the first mounting clip is in the first mounting clip second position and then the light engine housing is rotated in a first direction about an axis of the internal surface, as a result of contact between the first mounting clip first end region and the lighting device housing, the first mounting clip will pivot relative to the first pivot axis to a first mounting clip third position, where the first mounting clip engages the lighting device housing such that the mounting clip surface is biased in a direction away from the sidewall end region.

According to a fourth aspect of the present inventive subject matter, there is provided a method of installing a light engine housing in a lighting device housing, the method comprising:

positioning a light engine housing such that at least a portion of the light engine housing is within an internal space defined by a sidewall of a lighting device housing; and rotating the light engine housing relative to the lighting device housing.

In this fourth aspect of the present inventive subject matter, the rotating causes at least a first mounting clip which is mounted pivotally about a first pivot axis on a mounting clip surface of the light engine housing to pivot about the first pivot axis such that a first mounting clip first end region which is on the first mounting clip and is spaced from the first pivot axis, engages an internal surface of the lighting device housing, and biases the mounting clip in a direction away from a sidewall end region of the sidewall.

In this fourth aspect of the present inventive subject matter, the light engine housing comprises an electrical connection region which is engageable in an electrical receptacle According to a fifth aspect of the present inventive subject matter, there is provided a method of installing a trim element in a lighting device housing, the method comprising:

positioning a trim element such that at least a first portion of the trim element is within an internal space defined by an internal surface of a sidewall of a lighting device housing; and rotating the trim element relative to the lighting device housing.

In this fifth aspect of the present inventive subject matter, the lighting device housing comprises an electrical receptacle and the sidewall terminates in a sidewall end region.

In addition, in this fifth aspect of the present inventive subject matter, the trim element comprises the first portion and a second portion, the second portion of the trim element extending beyond the internal space, the second portion of the trim element comprising a second portion end region which is positioned farther from an axis of the internal surface than the sidewall end region.

In this fifth aspect of the present inventive subject matter, the rotating causes at least a first mounting clip which is mounted pivotally about a first pivot axis on a mounting clip surface of the trim element to pivot about the first pivot axis such that a first mounting clip first end region which is on the first mounting clip and which is spaced from the first pivot axis, engages an internal surface of the lighting device housing, and biases the trim element in a direction in which the second portion of the trim element is biased toward the sidewall end region.

According to a sixth aspect of the present inventive subject matter, there is provided a lighting device, comprising:

a trim element, the trim element comprising at least first and second portions, the second portion of the trim element comprising a second portion end region which is positioned farther from an axis of the first portion of the trim element than any part of the first portion of the trim element; and at least a first mounting clip, the first mounting clip being mounted pivotally about a first pivot axis on the trim element, the first mounting clip having a first mounting clip first end region, the first mounting clip first end region being spaced from the first pivot axis, the first mounting clip being pivotable about the first pivot axis at least from a first mounting clip first position, where the first mounting clip first end region does not extend beyond a periphery of the first portion of the trim element, to a first mounting clip second position, where the first mounting clip first end region extends beyond a periphery of the first portion of the trim element, such that if the trim element is placed within a housing with the first mounting clip in the first mounting clip second position and in contact with an internal surface of the housing, and then the trim element is rotated in a first direction about the axis of the trim element, the first mounting clip will pivot relative to the first pivot axis to a first mounting clip third position, where the first mounting clip engages the housing such that the second portion of the trim element is biased toward the housing.

In some embodiments according to the first aspect, the third aspect or the fourth aspect of the present inventive subject matter, the lighting device further comprises at least a first solid state light emitter and at least a first ballast element, in which a first region of the first ballast element is electrically connected to the electrical connection region, a second region of the first ballast element is electrically connected to the first solid state light emitter, and the first ballast element comprises circuitry which, if power of a first voltage is supplied to the first region of the first ballast element, outputs power of a second voltage, and supplies the power of the second voltage to the first solid state light emitter.

In some embodiments according to the present inventive subject matter, the lighting device further comprises at least second and third mounting clips, in which the second mounting clip is mounted pivotally about a second pivot axis on the mounting clip surface of the light engine housing (i.e., in embodiments which include a light engine housing) or on the trim element (i.e., in embodiments which include a trim element), the second mounting clip having a second mounting clip first end region, the second mounting clip first end region being spaced from the second pivot axis, and the third mounting clip is mounted pivotally about a third pivot axis on the mounting clip surface of the light engine housing or on the trim element (the third mounting clip having a third mounting clip first end region, the third mounting clip first end region being spaced from the third pivot axis).

In some embodiments according to the present inventive subject matter, the lighting device further comprises at least a first stop element mounted on the light engine housing or on the trim element, the first stop element being shaped and positioned such that the first stop element prevents the first mounting clip from rotating 360 degrees about the first pivot axis. In some such embodiments, the first stop element protrudes from the mounting clip surface or the trim element in a direction substantially perpendicular to the mounting clip surface or the trim element. In some such embodiments:

- the lighting device further comprises at least a second stop element mounted on the light engine housing, the second stop element being shaped and positioned such that the second stop element inhibits the first mounting clip from rotating from a position between the first stop element and the second stop element past the second stop element to a position which is not between the first stop element and the second stop element, and/or
- the lighting device further comprises at least a second stop element mounted on the light engine housing, the second stop element protruding from the mounting clip surface in a direction substantially perpendicular to the mounting clip surface, the first mounting clip being positioned between the first stop element and the second stop element.

In some embodiments according to the present inventive subject matter, the lighting device further comprises at least a first stop element mounted on the light engine housing or on the trim element, the first stop element being shaped and positioned such that the first stop element prevents the first mounting clip from rotating beyond a position where the first mounting clip first end region is a maximum distance from the light engine housing or the trim element. In some such embodiments:

- the first stop element protrudes from the mounting clip surface or the trim element in a direction substantially perpendicular to the mounting clip surface or the trim element,
- the lighting device further comprises at least a second stop element mounted on the light engine housing or on the trim element, the second stop element being shaped and positioned such that the second stop element inhibits the first mounting clip from rotating from a position between the first stop element and the second stop element past the second stop element to a position which is not between the first stop element and the second stop element, and/or
- the lighting device further comprises at least a second stop element mounted on the light engine housing or on the trim element, the second stop element protruding from the mounting clip surface or the trim element in a direction substantially perpendicular to the mounting clip surface or the trim element, the first mounting clip being positioned between the first stop element and the second stop element.

In some embodiments according to the third aspect of the present inventive subject matter, the sidewall defines an internal space, and the lighting device further comprises a flange portion extending from the light engine housing beyond the internal space, the flange portion comprising a flange portion end region which is positioned farther from the axis of the internal surface than the sidewall.

In some embodiments according to the second aspect, the third aspect, the fourth aspect or the fifth aspect of the present inventive subject matter, the lighting device housing is substantially cylindrical, and the flange portion end region or the second portion of the trim element extends in a direction which is substantially perpendicular to the axis of the internal surface.

In some embodiments according to the second aspect, the third aspect, the fourth aspect or the fifth aspect of the present inventive subject matter, the lighting device housing is substantially conical, and the flange portion end region or the second portion of the trim element extends in a direction which is substantially perpendicular to the axis of the internal surface.

In some embodiments according to the second aspect, the third aspect, the fourth aspect or the fifth aspect of the present inventive subject matter, the lighting device housing is substantially frustoconical, and the flange portion end region or the second portion of the trim element extends in a direction which is substantially perpendicular to the axis of the internal surface.

In some embodiments according to the third aspect or the fourth aspect of the present inventive subject matter, the lighting device further comprises at least a first cam element mounted on a surface of the lighting device housing, the cam element being shaped and positioned such that the light engine housing can be rotated about the axis of the internal surface such that the first mounting clip first end region is deflected by the first cam element in a direction along the axis of the internal surface.

In some embodiments according to the fourth aspect of the present inventive subject matter, the method further comprises connecting the electrical connection region to an electrical receptacle prior to the rotating the light engine housing relative to the lighting device housing.

In some embodiments according to the fourth aspect or the fifth aspect of the present inventive subject matter, the method further comprises positioning the first mounting clip in a first mounting clip second position, where the first mounting clip first end region extends beyond a periphery of the light engine housing or the first portion of the trim element, prior to the positioning the light engine housing or the trim element such that (1) at least a portion of the light engine housing is within the internal space, or (2) the first portion of the trim element is within the internal space.

In some embodiments according to the fourth aspect or the fifth aspect of the present inventive subject matter, during the rotating the light engine housing or the trim element relative to the lighting device housing, the first mounting clip is rotated about the first pivot axis to a position which is between (1) a first stop element mounted on the light engine housing or on the trim element and (2) a second stop element mounted on the light engine housing or on the trim element, and the first mounting clip is prevented from rotating about the first pivot axis past the first stop element by contacting the first stop element.

The inventive subject matter may be more fully understood with reference to the accompanying drawings and the following detailed description of the inventive subject matter.

BRIEF DESCRIPTION OF THE DRAWING FIGURES

DETAILED DESCRIPTION OF THE INVENTION(S)

Figure 1:
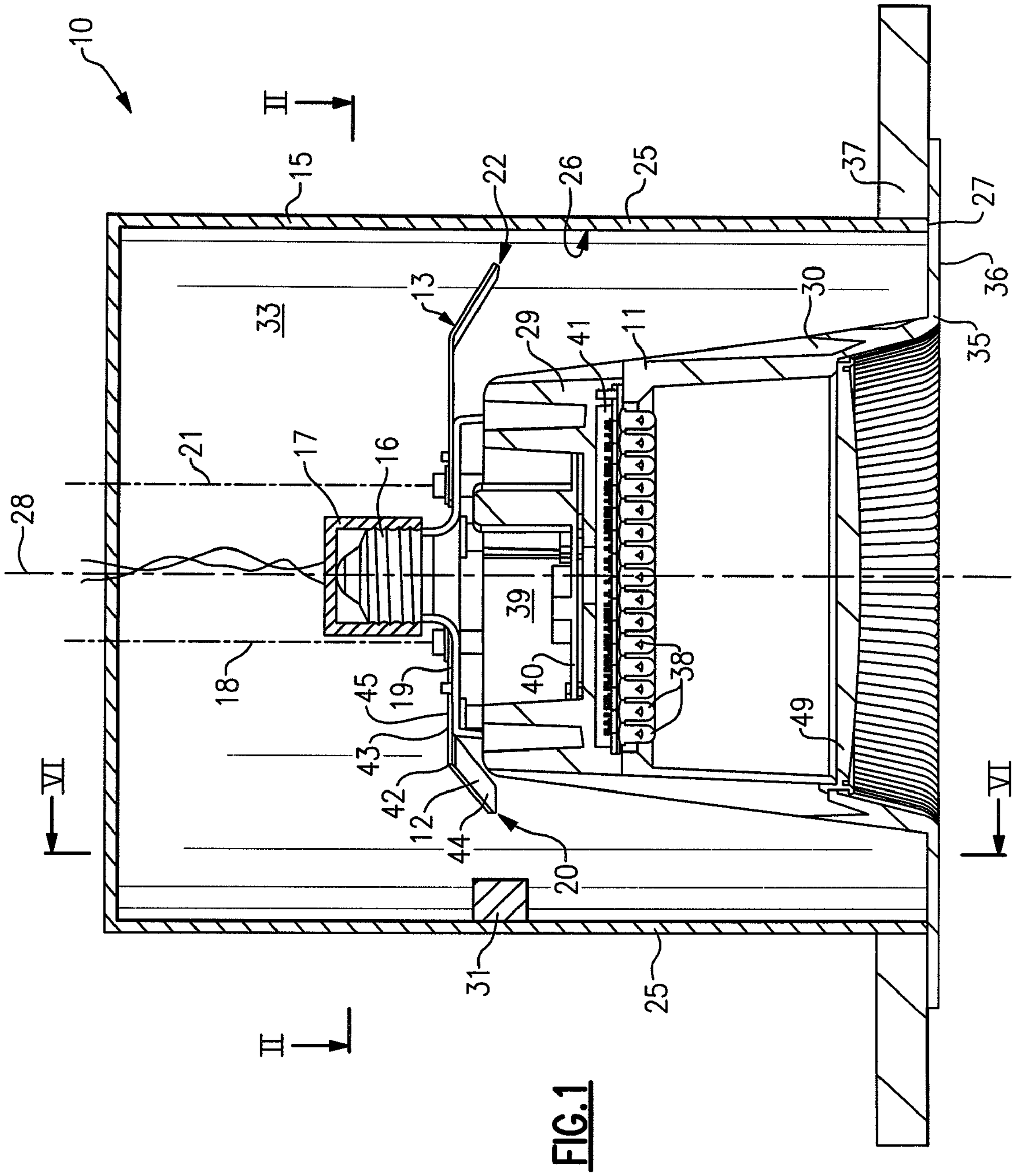
FIG. 1 is a sectional view of a first embodiment of a lighting device in accordance with the present inventive subject matter, with the mounting clips each in their second position.
Figure 2:
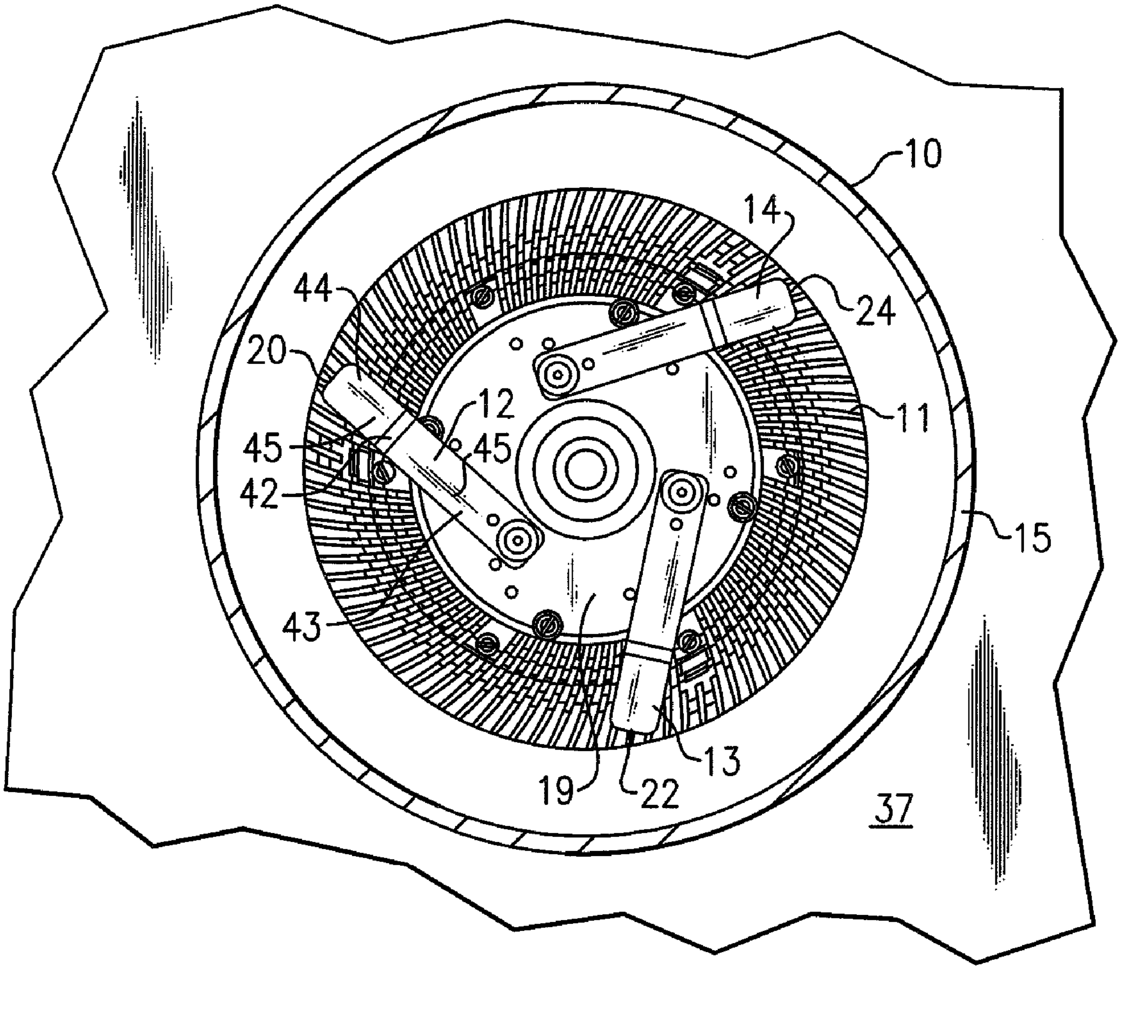
FIG. 2 is a top view of the lighting device depicted in FIG. 1, taken along plane II-II in FIG. 1, with the mounting clips each in their first position.
Figure 3:
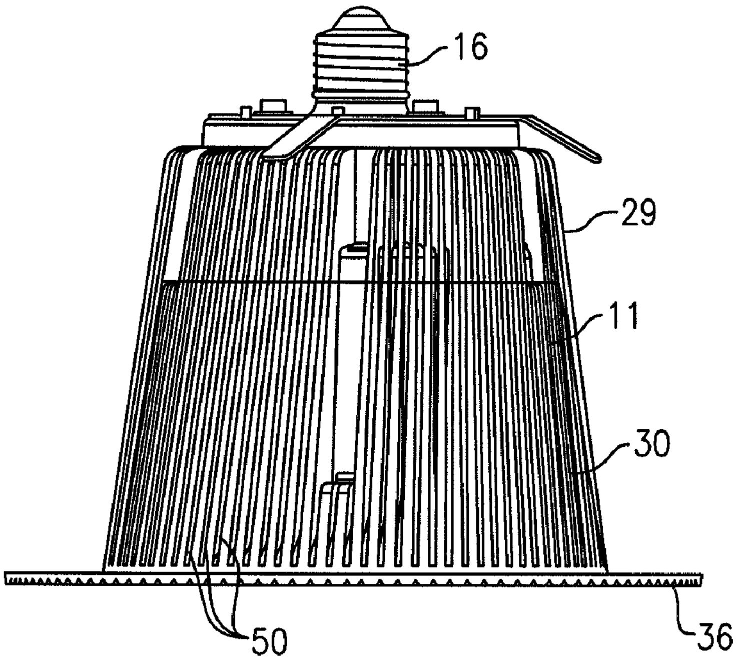
FIG. 3 is a front view of the lighting device depicted in FIG. 2, with the lighting device housing removed.

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "lighting device", as used herein, is not limited, except that it is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosure (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

The expression "mounted on", as used herein, means that the first structure which is "on" a second structure can be in contact with the second structure, or can be separated from the second structure by one or more intervening structures (each side, of opposite sides, of which is in contact with the first structure, the second structure or one of the intervening structures).

The expression "on", e.g., as used in the expression "mounted on", or "provided on", means that the first structure which is "on" a second structure can be in contact with the second structure, or can be separated from the second structure by one or more intervening structures (each side, or opposite sides, of which is in contact with the first structure, the second structure or one of the intervening structures).

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

Where one or more lumiphor is employed, when the lumiphor is "excited", at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

As used herein, the term "substantially," e.g., in the expressions "substantially perpendicular", "substantially cylindrical", "substantially conical", "substantially frustoconical", "substantially vertical", etc., means at least about 90% correspondence with the feature recited, e.g., The expression "substantially perpendicular", as used herein, means that at least 90% of the points in the structure which is characterized as being substantially perpendicular to a reference plane or line are located on one of or between a pair of planes (1) which are perpendicular to the reference plane, (2) which are parallel to each other and (3) which are spaced from each other by a distance of not more than 10% of the largest dimension of the structure;

the expression "substantially cylindrical", as used herein, means that at least 90% of the points in the surface which is characterized as being substantially cylindrical are located on one of or between a pair of imaginary cylindrical structures which are spaced from each other by a distance of not more than 10% of their largest dimension;

the expression "substantially conical", as used herein, means that at least 90% of the points in the surface which is characterized as being substantially conical are located on one of or between a pair of imaginary conical structures which are spaced from each other by a distance of not more than 10% of their largest dimension; and the expression "substantially frustoconical", as used herein, means that at least 90% of the points in the surface which is characterized as being substantially frustoconical are located on one of or between a pair of imaginary frustoconical structures which are spaced from each other by a distance of not more than 10% of their largest dimension.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in some of the embodiments of the present inventive subject matter, there is provided a lighting device housing. The lighting device housing in such embodiments can be of any desired shape, and can be made of any desired material, a wide variety of both of which are well-known to persons skilled in the art. A representative example of a material out of which the lighting device housing can be made is rolled steel.

As noted above, in some of the embodiments of the present inventive subject matter, there is provided a light engine housing. The light engine housing in such embodiments can be of any desired shape, and can be made of any desired material, a wide variety of both of which are well-known to persons skilled in the art. A representative example of a material out of which the light engine housing can be made is aluminum, which provides excellent heat transfer properties, which would assist in dissipating heat generated by the light engine. In some embodiments, the light engine housing has a plurality of fin elements which increase the surface area of the light engine housing, thereby increasing the heat dissipation characteristics of the lighting device.

In some embodiments of the present inventive subject matter, the light engine housing houses a ballast element and at least one light emitter (e.g., a solid state light emitter, such as one or more LEDs, some or all of which may or may not further include a luminescent material). Any desired ballast can be employed in such embodiments according to the present inventive subject matter, so long as such ballast is effective to deliver energy to the light emitter(s) in such a form that the light emitter(s) will emit light, and persons of skill in the art are aware of, and have ready access to, a wide variety of such ballasts for various light emitters.

For example, housings which may be used as lighting device housings or light engine housings in practicing the present inventive subject matter, and light engines which may be used in practicing the present inventive subject matter are described in:

(1) U.S. Patent Application No. 60/752,753, filed on Dec. 21, 2005, entitled "Lighting Device" (inventors: Gerald H. Negley, Antony Paul van de Ven and Neal Hunter;) and U.S. patent application Ser. No. 11/613,692, filed Dec. 20, 2006, the entireties of which are hereby incorporated by reference;

(2) U.S. Patent Application No. 60/798,446, filed on May 5, 2006, entitled "Lighting Device" (inventor: Antony Paul van de Ven) and U.S. patent application Ser. No. 11/743,754, filed May 3, 2007, the entireties of which are hereby incorporated by reference;

(3) U.S. Patent Application No. 60/845,429, filed on Sep. 18, 2006, entitled "LIGHTING DEVICES, LIGHTING ASSEMBLIES, FIXTURES AND METHODS OF USING SAME" (inventor: Antony Paul van de Ven), and U.S. patent application Ser. No. 11/856,421, filed Sep. 17, 2007, the entireties of which are hereby incorporated by reference;

(4) U.S. Patent Application No. 60/846,222, filed on Sep. 21, 2006, entitled "LIGHTING ASSEMBLIES, METHODS OF INSTALLING SAME, AND METHODS OF REPLACING LIGHTS" (inventors: Antony Paul van de Ven and Gerald H. Negley ), and U.S. patent application Ser. No. 11/859,048, filed Sep. 21, 2007, the entireties of which are hereby incorporated by reference;

(5) U.S. Patent Application No. 60/809,618, filed on May 31, 2006, entitled "LIGHTING DEVICE AND METHOD OF LIGHTING" (inventors: Gerald H. Negley, Antony Paul van de Ven and Thomas G. Coleman) and U.S. patent application Ser. No. 11/755,153, filed May 30, 2007, the entireties of which are hereby incorporated by reference;

(6) U.S. Patent Application No. 60/858,881, filed on Nov. 14, 2006, entitled "LIGHT ENGINE ASSEMBLIES" (inventors: Paul Kenneth Pickard and Gary David Trott ), the entirety of which is hereby incorporated by reference;

(7) U.S. Patent Application No. 60/859,013, filed on Nov. 14, 2006, entitled "LIGHTING ASSEMBLIES AND COMPONENTS FOR LIGHTING ASSEMBLIES" (inventors: Gary David Trott and Paul Kenneth Pickard ) and U.S. patent application Ser. No. 11/736,799, filed Apr. 18, 2007, the entireties of which are hereby incorporated by reference;

(8) U.S. Patent Application No. 60/853,589, filed on Oct. 23, 2006, entitled "LIGHTING DEVICES AND METHODS OF INSTALLING LIGHT ENGINE HOUSINGS AND/OR TRIM ELEMENTS IN LIGHTING DEVICE HOUSINGS" (inventors: Gary David Trott and Paul Kenneth Pickard), the entirety of which is hereby incorporated by reference;

(9) U.S. Patent Application No. 60/861,901, filed on Nov. 30, 2006, entitled "LED DOWNLIGHT WITH ACCESSORY ATTACHMENT" (inventors: Gary David Trott, Paul Kenneth Pickard and Ed Adams), the entirety of which is hereby incorporated by reference; and

(10) U.S. Patent Application No. 60/916,384, filed on May 7, 2007, entitled "LIGHT FIXTURES, LIGHTING DEVICES, AND COMPONENTS FOR THE SAME" (inventors: Paul Kenneth Pickard, Gary David Trott and Ed Adams ), the entirety of which is hereby incorporated by reference.

As noted above, in some of the embodiments of the present inventive subject matter, there is provided a trim element. The trim element in such embodiments can be of any desired shape, and can be made of any desired material, a wide variety of both of which are well-known to persons skilled in the art. A representative example of a material out of which the trim element can be made is rolled steel.

As noted above, in each of the embodiments of the present inventive subject matter, there is provided at least a first mounting clip.

The one or more mounting clip can be of any suitable shape, and can be made of any suitable material (so long as the mounting clip(s) are effective to perform the functions described herein), a variety of which will be readily apparent to persons skilled in the art in view of the present description. A representative example of a material out of which the mounting clip(s) can be made is spring steel. While several embodiments are described herein which include three mounting clips, in general, any desired number of mounting clips can be employed, depending on the geometries of the other components in the design and so long as the mounting clip(s) are effective to perform the functions described herein.

The (or each of the) mounting clip(s) can be mounted on the structure on which it is to be mounted (i.e., the light engine housing or the trim element) in any desired way. Skilled artisans are familiar with a wide variety of ways to pivotally mount one element on another element, and any such way can be employed in making the lighting devices according to the present inventive subject matter, so long as the (or each) mounting clip is able to pivot about its pivot axis and is securely held in place.

As noted above, in some of the embodiments of the present inventive subject matter, there is provided at least a first stop element mounted on the light engine housing or on the trim element. The one or more stop elements in such embodiments can be of any desired shape, and can be made of any desired material, a variety of both of which will be apparent to persons skilled in the art in view of the present description, so long as the stop element(s) are effective to perform the functions described herein.

In some embodiments which include one or more stop elements, at least one stop element is positioned such that it will inhibit or prevent a mounting clip from rotating beyond a desired position. In some such embodiments, at least a second stop element which also inhibits or prevents the mounting clip from rotating beyond a desired position. For instance, in some embodiments, the stop elements are positioned and shaped so that e.g., during shipment, the (or each) mounting clip can be in a first position (i.e., of rotation relative to its pivot axis) in which the (or each) mounting clip is inside the outer diameter of the structure on which it is mounted (a light engine housing or a portion of a trim element), and when ready to install the light engine housing or trim element, the (or each) mounting clip is rotated to a second position in which the (or each) mounting clip is protruding (to some degree, but not to the maximum extent possible) from the structure on which it is mounted, with the (or each) mounting clip overlapping the (or a respective) second stop element or not in contact with the second stop element, and then the light engine housing or trim element is inserted into the lighting device housing, and when the light engine housing or trim element has been inserted into the lighting device housing to the desired extent (e.g., the "flange portion", discussed above, or the "second portion" of the trim element is flush with the sidewall end region of the lighting device housing), the light engine housing or trim element is then rotated relative to the lighting device housing such that the (or each) mounting clip is rotated to a third position in which the (or each) mounting clip extends farther from the structure on which it is mounted and engages the internal surface of the sidewall of the lighting device housing, thereby holding the light engine housing or the trim element relative to the lighting device housing, at which point the (or each) mounting clip is located between the (or a respective) first stop element and the (or a respective) second stop element, the first stop element preventing the (or each respective) mounting clip from rotating beyond a desired location (e.g., perpendicular to a tangent of an outer periphery of the light engine housing or the trim element), and the second stop element inhibiting the (or each respective) mounting clip from rotating back toward the second position beyond a desired location. In the event that it becomes necessary or desired to remove the light engine housing or the trim element from the lighting device housing, the light engine housing or the trim element can be rotated in the opposite direction, while pulling down on the light engine housing or trim element, such that the (or each) mounting clip clears and passes above the (or the respective) second stop, such that the (or each) mounting clip can be returned to its second position, and then the light engine housing or trim element can be removed from the lighting device housing.

In addition, in some embodiments, a bump/recess combination is provided, in which one of a bump and a recess is provided on at least one mounting clip and the other of a bump and a recess is provided on the structure on which the mounting clip(s) is mounted, such that when the mounting clip(s) is/are in the third position, the (or each) bump is received in the (or a respective) recess, thereby tending to hold the mounting clip(s) in its (or their) third position(s). In such embodiments, when the bump is accommodated in the recess, the bump/recess combination provides a stable third clip position, and positive tactile feedback that the clip is fully deployed (e.g., protruding a maximum extent from the structure on which the mounting clip is mounted) in order to engage the internal surface of the lighting device housing.

The rigidity of the mounting clip(s) required in order to securely hold the light engine housing or the trim element in place, and the pressure on the (or each) mounting clip at its pivot point can readily be adjusted in order to meet the needs (i.e., to provide some or all of the functions described herein) of any particular combination of light engine housing (or trim element) and lighting device housing, and other components. For example, to increase the pressure on the (or each) mounting clip at its pivot point, the structure holding the mounting clip to the structure on which it is mounted can be tightened (e.g., in the case of a rivet, the distance between the retaining structures can be incrementally shortened). To increase the rigidity of the (or each) mounting clip, the thickness or width of the (or each) mounting clip can be increased.

In some embodiments of the present inventive subject matter, the mounting clip(s) are in the shape of an elongated rectangle, which may or may not have at least one bent portion. In some embodiments, the first end region (i.e., the part of the mounting clip which engages the internal surface of the sidewall of the lighting device housing) of the first mounting clip is spaced from the pivot axis by a distance which is at least three times a minimum dimension of the mounting clip in a first plane which is perpendicular to the first pivot axis, i.e., the mounting clip is in the shape of an elongated rectangle, with the distance in one dimension of the rectangle (extending from the pivot axis to the first end region) is at least three time the distance in the other dimension of the rectangle. The mounting clip(s) can generally be of any desired thickness, depending on the rigidity needed. In some embodiments of the present inventive subject matter, the (or each) mounting clip has a thickness in the range of from about 0.016 inches to about 0.050 inches, and in some embodiments, in the range of from about 0.018 inches to about 0.025 inches.

As mentioned above, in some embodiments, the mounting clip has at least one bent portion. Alternatively, the mounting clip is not bent (i.e., it is substantially flat or curved) The bent portion (in embodiments in which the mounting clip is bent) is preferably located between the pivot axis and the first end region. In such embodiments, the angle of the one or more bent portion is any desired angle, e.g., about 10 degrees, about 20 degrees or about 30 degrees.

In some embodiments of the present inventive subject matter, the first end region of the mounting clip, or of one or more of the mounting clips, is/are sharpened so as to more firmly engage the internal wall of the lighting device housing. A variety of ways to sharpen the first end region of the mounting clip will be readily apparent to persons of skill in the art, and all such ways are included in the present inventive subject matter. For example, the first end region can be V-shaped, i.e., such that the first end region includes a pair of prong-like regions which extend from the end of the mounting clip. In another representative example, the first end region can taper in thickness at the first end region, such that the remote end is relatively sharp.

As noted above, in some of the embodiments of the present inventive subject matter, there is provided at least a first cam element mounted on a surface of the lighting device housing, the cam element being shaped and positioned such that the light engine housing can be rotated about the axis of the internal surface such that the first end region of the mounting clip is deflected by the cam element in a direction along the axis of the internal surface. The one or more cam elements in such embodiments can be of any desired shape, and can be made of any desired material, a variety of both of which will be apparent to persons skilled in the art in view of the present description, so long as the cam element(s) are effective to perform the functions described herein. The expression "deflected by the cam element" means that as the structure on which the mounting clip is mounted is rotated relative to the lighting device housing, not only does the mounting clip move relative to the structure on which it is mounted about to its pivot axis, but the first end region of the mounting clip also moves in a direction which is parallel to the pivot axis for the mounting clip. For example, if the internal surface of the lighting device and the structure on which the mounting chip is mounted are both cylindrical, with their axes substantially vertical, if the first end region of the mounting clip is deflected by a cam element while rotating the structure on which the mounting chip is mounted relative to the lighting device housing, the mounting clip is rotated about its pivot axis and is bent as a result of the first end region of the mounting clip moving along a surface of the cam, such that path the first end region of the mounting clip is altered from being solely rotational motion about the pivot axis, and is pushed, e.g., downward, by the surface of the cam. In a representative example, a cam forces the first end region of the mounting clip downward toward the room-side by a distance of ⅓" to ¼" as the light engine housing or the trim element is rotated such that the mounting clip moves from the second position to the third position.

As noted above, in some embodiments of the present inventive subject matter, the light engine housing comprises an electrical connection region which is engageable in an electrical receptacle. Any desired electrical connection regions and electrical receptacles can be employed in accordance with the present inventive subject matter, and persons of skill in the art are aware of, and have ready access to, a wide variety of such electrical connection regions and electrical receptacles. For example, the electrical receptacle can be a standard Edison socket, and the electrical connection region can be a screw-threaded portion which can be screwed into an Edison socket. Alternatively, the electrical connection region can be a standard plug and the electrical receptacle can be a standard outlet, or the electrical connection region can be a clip and the electrical receptacle can be a receptacle which receives and retains the clip (e.g., as used in many fluorescent lights). The options for such connection regions and receptacles are not constrained in any way, apart from the need to safely deliver electricity from the receptacle to the connection region.

A number of additional structures can also be included in the lighting devices according to the present inventive subject matter. For example, the lighting devices according to the present inventive subject matter can further include a diffuser. Any desired diffuser can be employed, and persons skilled in the art are familiar with and have easy access to a variety of such diffusers. In some embodiments of the present inventive subject matter, a diffuser is mounted to the lighting device housing below the light engine housing, whereby light emitted from the light engine passes through the diffuser and is diffused prior to exiting the lighting device into the region that will be illuminated by the lighting device, e.g., into a room. Alternatively or additionally, the lighting devices according to the present inventive subject matter can include a reflective element. Any desired reflective element can be employed, and persons skilled in the art are familiar with and have easy access to a variety of such reflective elements. A representative example of a suitable material out of which the reflective element can be made is a material marketed by Furukawa (a Japanese corporation) under the trademark MCPET®. In some embodiments of the present inventive subject matter, a reflective element is shaped and is positioned so as to cover at least part of the internal surface of the sidewall of the lighting device housing. In some embodiments of the present inventive subject matter, a diffuser is provided and is mounted to the lighting device housing below the light engine housing, and a reflective element is provided and is mounted so as to cover the internal surface of the sidewall of the lighting device housing below the diffuser.

As noted above, some embodiments of the present inventive subject matter comprise one or more solid state light emitters. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

Where more than one solid state light emitters are provided, the respective light emitters can be similar to one another, different from one another or any combination (i.e., there can be a plurality of solid state light emitters of one type, or one or more solid state light emitters of each of two or more types).

As indicated above, the lighting devices according to the present inventive subject matter which include one or more solid state light emitters can comprise any desired number of solid state light emitters. For example, a lighting device according to the present inventive subject matter can include 50 or more light emitting diodes, or can include 100 or more light emitting diodes, etc.

As noted above, in some embodiments according to the present inventive subject matter, one or more luminescent material can be employed. The expression "lumiphor", as used herein, refers to any luminescent element, i.e., any element which includes a luminescent material.

One or more lumiphors, when provided, can individually be any lumiphor, a wide variety of which are known to those skilled in the art. For example, the one or more luminescent materials in the lumiphor can be selected from among phosphors, scintillators, day glow tapes, inks which glow in the visible spectrum upon illumination with ultraviolet light, etc. The one or more luminescent materials can be down-converting or up-converting, or can include a combination of both types. For example, the first lumiphor can comprise one or more down-converting luminescent materials.

The (or each) lumiphor can, if desired, further comprise (or consist essentially of, or consist of) one or more highly transmissive (e.g., transparent or substantially transparent, or somewhat diffuse) binder, e.g., made of epoxy, silicone, glass, metal oxide, or any other suitable material (for example, in any given lumiphor comprising one or more binder, one or more phosphor can be dispersed within the one or more binder). In general, the thicker the lumiphor, the lower the weight percentage of the phosphor can be.

Devices in which a lumiphor is provided can, if desired, further comprise one or more clear encapsulant (comprising, e.g., one or more silicone materials) positioned between the solid state light emitter (e.g., light emitting diode) and the lumiphor.

The (or each) lumiphor can, independently, further comprise any of a number of well-known additives, e.g., diffusers, scatterers, tints, etc.

Representative examples of LEDs and lumiphors which are suitable for use in the present inventive subject matter are described in:

(1) U.S. Patent Application No. 60/753,138, filed on Dec. 22, 2005, entitled "Lighting Device" (inventor: Gerald H. Negley) and U.S. patent application Ser. No. 11/614,180, filed Dec. 21, 2006, the entireties of which are hereby incorporated by reference;

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven) and U.S. patent application Ser. No. 11/624,811, filed Jan. 19, 2007, the entireties of which are hereby incorporated by reference;

(3) U.S. Patent Application No. 60/808,702, filed on May 26, 2006, entitled "Lighting Device" (inventors: Gerald H. Negley and Antony Paul van de Ven) and U.S. patent application Ser. No. 11/751,982, filed May 22, 2007, the entireties of which are hereby incorporated by reference;

(4) U.S. Patent Application No. 60/808,925, filed on May 26, 2006, entitled "Solid State Light Emitting Device and Method of Making Same" (inventors: Gerald H. Negley and Neal Hunter) and U.S. patent application Ser. No. 11/753,103, filed May 24, 2007, the entireties of which are hereby incorporated by reference;

(5) U.S. Patent Application No. 60/802,697, filed on May 23, 2006, entitled "Lighting Device and Method of Making" (inventor: Gerald H. Negley) and U.S. patent application Ser. No. 11/751,990, filed May 22, 2007, the entireties of which are hereby incorporated by reference;

(6) U.S. patent application Ser. No. 60/839,453, filed on Aug. 23, 2006, entitled "LIGHTING DEVICE AND LIGHTING METHOD" (inventors: Antony Paul van de Ven and Gerald H. Negley) and U.S. patent application Ser. No. 11/843,243, filed Aug. 22, 2007, the entireties of which are hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley , the entirety of which is hereby incorporated by reference; and (9) U.S. Patent Application No. 60/793,524, filed on Apr. 20, 2006, entitled "LIGHTING DEVICE AND LIGHTING METHOD" (inventors: Gerald H. Negley and Antony Paul van de Ven and U.S. patent application Ser. No. 11/736,761, filed Apr. 18, 2007, the entireties of which are hereby incorporated by reference.

In general, light of any number of colors can be mixed by the lighting devices according to the present inventive subject matter. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley) and U.S. patent application Ser. No. 11/613,714, filed Dec. 20, 2006, the entireties of which are hereby incorporated by reference;

(2) U.S. patent application No. 60/752,556, filed on Dec. 21, 2005, entitled "SIGN AND METHOD FOR LIGHTING" (inventors: Gerald H. Negley and Antony Paul van de Ven) and U.S. patent application Ser. No. 11/613,733, filed Dec. 20, 2006, the entireties of which are hereby incorporated by reference;

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven) and U.S. patent application Ser. No. 11/736,761, filed Apr. 18, 2007, the entireties of which are hereby incorporated by reference;

(4) U.S. Patent Application No. 60/793,518, filed on Apr. 20, 2006, entitled "LIGHTING DEVICE AND LIGHTING METHOD" (inventors: Gerald H. Negley and Antony Paul van de Ven) and U.S. patent application Ser. No. 11/736,799, filed Apr. 18, 2007, the entireties of which are hereby incorporated by reference;

(5) U.S. Patent Application No. 60/793,530, filed on Apr. 20, 2006, entitled "LIGHTING DEVICE AND LIGHTING METHOD" (inventors: Gerald H. Negley and Antony Paul van de Ven) and U.S. patent application Ser. No. 11/737,321, filed Apr. 19, 2007, the entireties of which are hereby incorporated by reference;

(6) U.S. Pat. No. 7,213,940, issued on May 8, 2007, entitled "LIGHTING DEVICE AND LIGHTING METHOD" (inventors: Antony Paul van de Ven and Gerald H. Negley ), the entirety of which is hereby incorporated by reference;

(7) U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference;

(8) U.S. Patent Application No. 60/868,986, filed on Dec. 7, 2006, entitled "LIGHTING DEVICE AND LIGHTING METHOD" (inventors: Antony Paul van de Ven and Gerald H. Negley), the entirety of which is hereby incorporated by reference;

(9) U.S. Patent Application No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference; and

(10) U.S. Patent Application No. 60/891,148, filed on Feb. 22, 2007, entitled "LIGHTING DEVICE AND METHODS OF LIGHTING, LIGHT FILTERS AND METHODS OF FILTERING LIGHT" (inventor: Antony Paul van de Ven, the entirety of which is hereby incorporated by reference.

One or more brightness enhancement films can optionally further be included in the lighting devices according to this aspect of the present inventive subject matter. Such films are well-known in the art and are readily available. Brightness enhancement films (e.g., BEF films commercially available from 3M) are optional—when employed, they provide a more directional light source by limiting the acceptance angle. Light not "accepted" is recycled by the highly reflective light source enclosure. Preferably, the brightness enhancement films (which can optionally be replaced by one or more extraction films, such as by WFT), if employed, are optimized to limit the viewing angle of the emitted source and to increase the probability of extracting light on the first (or earliest possible) pass.

The lighting devices of the present inventive subject matter can be supplied with electricity in any desired manner. Skilled artisans are familiar with a wide variety of power supplying apparatuses, and any such apparatuses can be employed in connection with the present inventive subject matter. The lighting devices of the present inventive subject matter can be electrically connected (or selectively connected) to any desired power source, persons of skill in the art being familiar with a variety of such power sources.

In addition, any desired circuitry can be employed in order to supply energy to the lighting devices according to the present inventive subject matter. Representative examples of circuitry which may be used in practicing the present inventive subject matter is described in:

(1) U.S. Patent Application No. 60/752,753, filed on Dec. 21, 2005, entitled "Lighting Device" (inventors: Gerald H. Negley, Antony Paul van de Ven and Neal Hunter) and U.S. patent application Ser. No. 11/613,692, filed Dec. 20, 2006, the entireties of which are hereby incorporated by reference;

(2) U.S. Patent Application No. 60/798,446, filed on May 5, 2006, entitled "Lighting Device" (inventor: Antony Paul van de Ven) and U.S. patent application Ser. No. 11/743,754, filed May 3, 2007, the entireties of which are hereby incorporated by reference;

(3) U.S. Patent Application No. 60/809,959, filed on Jun. 1, 2006, entitled "Lighting Device With Cooling" (inventors: Thomas G. Coleman, Gerald H. Negley and Antony Paul van de Ven) and U.S. patent application Ser. No. 11/626,483, filed Jan. 24, 2007, the entireties of which are hereby incorporated by reference;

(4) U.S. Patent Application No. 60/809,595, filed on May 31, 2006, entitled "LIGHTING DEVICE AND METHOD OF LIGHTING" (inventor: Gerald H. Negley) and U.S. patent application Ser. No. 11/755,162, filed May 30, 2007, the entireties of which are hereby incorporated by reference;

(5) U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers), and U.S. patent application Ser. No. 11/854,744, filed Sep. 13, 2007, the entireties of which are hereby incorporated by reference;

The present inventive subject matter is further directed to an illuminated enclosure, comprising an enclosed space and at least one lighting device as described herein, wherein the lighting device illuminates at least a portion of the enclosure.

The present inventive subject matter is further directed to an illuminated surface, comprising a surface and at least one lighting device as described herein, wherein if the lighting device is illuminated, the lighting device would illuminate at least a portion of the surface.

The present inventive subject matter is further directed to an illuminated area, comprising at least one item selected from among the group consisting of a swimming pool, a room, a warehouse, an indicator, a road, a vehicle, a road sign, a billboard, a ship, a toy, an electronic device, a boat, an aircraft, a stadium, a toy, a computer, a remote audio device, a remote video device, a cell phone, a tree, a window, and a lamppost, having mounted therein or thereon at least one lighting device as described herein.

Embodiments in accordance with the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

FIGS. 1-5 depict a first embodiment of a lighting device in accordance with the present inventive subject matter. Referring to FIG. 1, there is shown a lighting device 10 which comprises a light engine housing 11, a flange portion 35, a first mounting clip 12, a second mounting clip 13, a third mounting clip 14 (not visible in FIG. 1) and a lighting device housing 15.

The light engine housing 11 comprises a screw-threaded electrical connection region 16 which is engaged in an electrical receptacle 17 (in the embodiment depicted, the electrical receptacle is an Edison socket).

The first mounting clip 12 is mounted pivotally about a first pivot axis 18 on a mounting clip surface 19 of the light engine housing 11. The first mounting clip 12 has a first mounting clip first end region 20 which is spaced from the first pivot axis 18.

Similarly, the second mounting clip 13 is mounted pivotally about a second pivot axis 21 on the mounting clip surface 19 of the light engine housing 11. The second mounting clip 13 has a second mounting clip first end region 22 which is spaced from the second pivot axis 21.

Similarly, the third mounting clip 14 is mounted pivotally about a third pivot axis (not visible in FIG. 1) on the mounting clip surface 19 of the light engine housing 11. The third mounting clip 14 has a third mounting clip first end region 24 which is spaced from the third pivot axis 23.

The lighting device housing 15 comprises a sidewall 25 having an internal surface 26. The sidewall 25 terminates in a sidewall end region 27.

The first mounting clip 12 is pivotable about the first pivot axis 18 to a number of positions, including a first mounting clip first position (depicted in FIGS. 2 and 3), where the first mounting clip first end region 20 does not extend beyond a periphery of the light engine housing 11, to a first mounting clip second position (depicted in FIG. 1), where the first mounting clip first end region 20 extends beyond a periphery of the light engine housing 11 and into contact with the lighting device housing 15, such that if the light engine housing 11 is rotated counter-clockwise (looking up from below in FIG. 1), about an axis 28 of the internal surface 26, as a result of the contact between the first mounting clip first end region 20 and the lighting device housing 15, the first mounting clip 12 will pivot relative to the first pivot axis 18 to a first mounting clip third position (depicted in FIG. 4), where the first mounting clip 12 engages the lighting device housing 15 such that the mounting clip surface 19 is biased in a direction away from the sidewall end region 27, i.e., the light engine housing 11 is biased upward (in the orientation shown in FIG. 1) relative to the lighting device housing 15.

The first mounting clip first end region 20 is spaced from the first pivot axis 18 by a distance which is more than three times the minimum dimension of the first mounting clip 12 in a plane which is perpendicular to the first pivot axis 18, i.e., the length of the first mounting clip 12 (more easily seen in FIGS. 2 and 4) is more than three times the width of the first mounting clip 12.

The first mounting clip 12 has a bent portion 42 between a first mounting clip first portion 43 and a first mounting clip second portion 44, the first mounting clip first end region 20 being located in the first mounting clip second portion 44, a second plane defined by at least two points on a first surface 45 of the first mounting clip 12 in the bent portion 42 and a point on the first surface 45 of the first mounting clip 12 in the first mounting clip first end region 20 defining an angle of at least 20 degrees relative to a first plane which is perpendicular to the first pivot axis 18.

Referring again to FIG. 1, the light engine housing 11 comprises an upper housing 29 and a lower housing 30.

Figure 6:
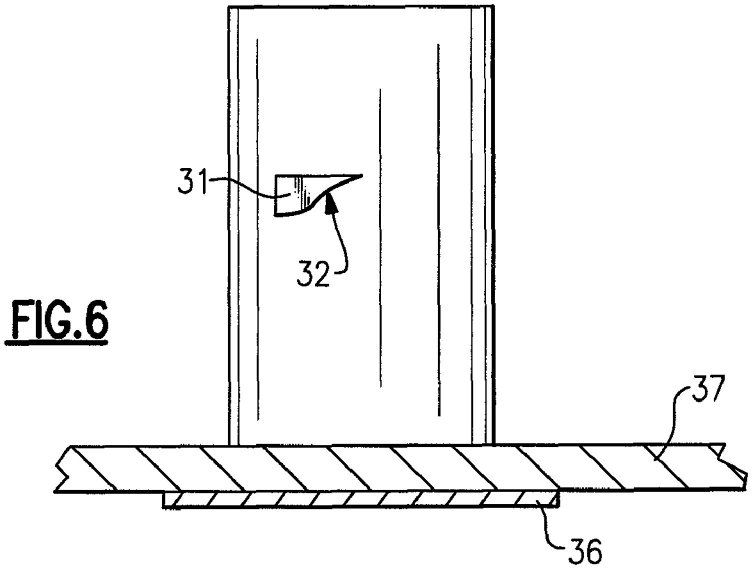
FIG. 6 is a view along the plane VI-VI in FIG. 1.

A first cam element 31 is mounted on the internal surface 26 of the lighting device housing 15. The cam element 31 is shaped and positioned such that when the light engine housing 11 is rotated about the axis 28 of the internal surface 26, the first mounting clip first end region 20 is deflected by the first cam element 31 in a direction along the axis 28 of the internal surface 26, i.e., downward in the orientation depicted in FIG. 1. FIG. 6 is a view along the plane VI-VI in FIG. 1, from which the surface 32 of the first cam element 31 which causes the deflection is apparent.

The sidewall 25 defines an internal space 33. As noted above, the lighting device 10 comprises a light engine housing 11 and a flange portion 35. The light engine housing 11 is positioned within the internal space 33, and the flange portion 35 extends beyond the internal space 33. The flange portion 35 comprises a flange portion end region 36 which is positioned farther from the axis 28 of the internal surface 26 than the sidewall 25. The upper surface of the flange portion end region 36 is in contact with a ceiling 37.

In this embodiment, the lighting device housing 15 is substantially cylindrical, and the flange portion end region 36 extends in a direction which is substantially perpendicular to the axis 28 of the internal surface 26.

This embodiment includes a ballast element 39, a circuit board 40 on which are mounted a plurality of LEDs 38, and a heat transfer region 41 comprising epoxy with dispersed particles of SiC. A first region of the ballast element 39 is electrically connected to the electrical connection region 16, and a second region of the ballast element 39 is electrically connected to the circuit board 40 (and thus also to the LEDs 38). The ballast element 39 comprises circuitry which, if power of a first voltage is supplied to the first region of the first ballast element, outputs power of a second voltage, and supplies the power of the second voltage to the LEDs 38.

Figure 4:
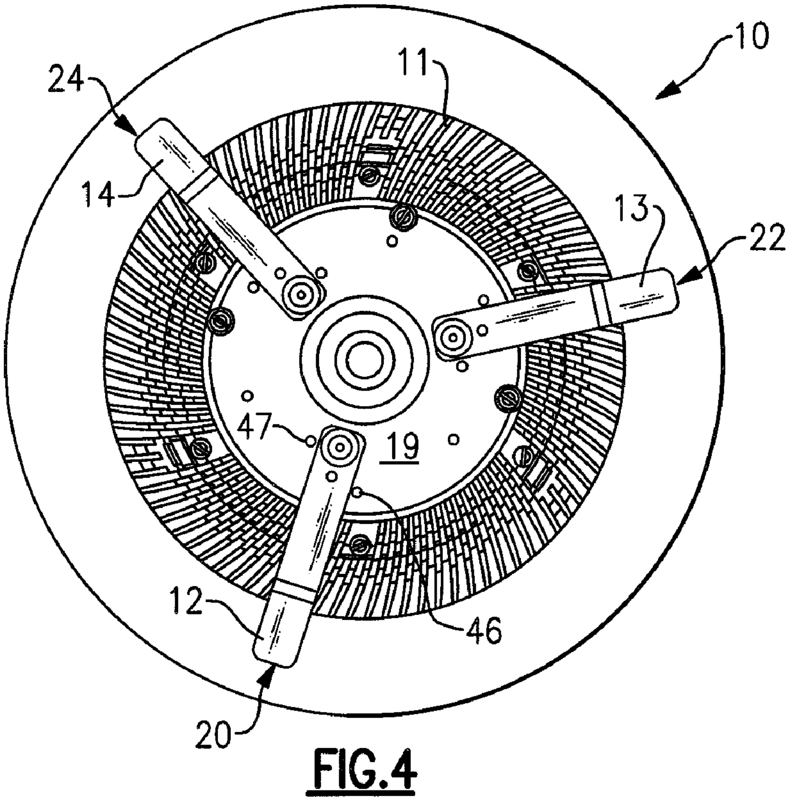
FIG. 4 is a top view of the lighting device depicted in FIG. 1, taken along plane II-II in FIG. 1, with the mounting clips each in their third position and with the lighting device housing and the ceiling not shown.
Figure 5:
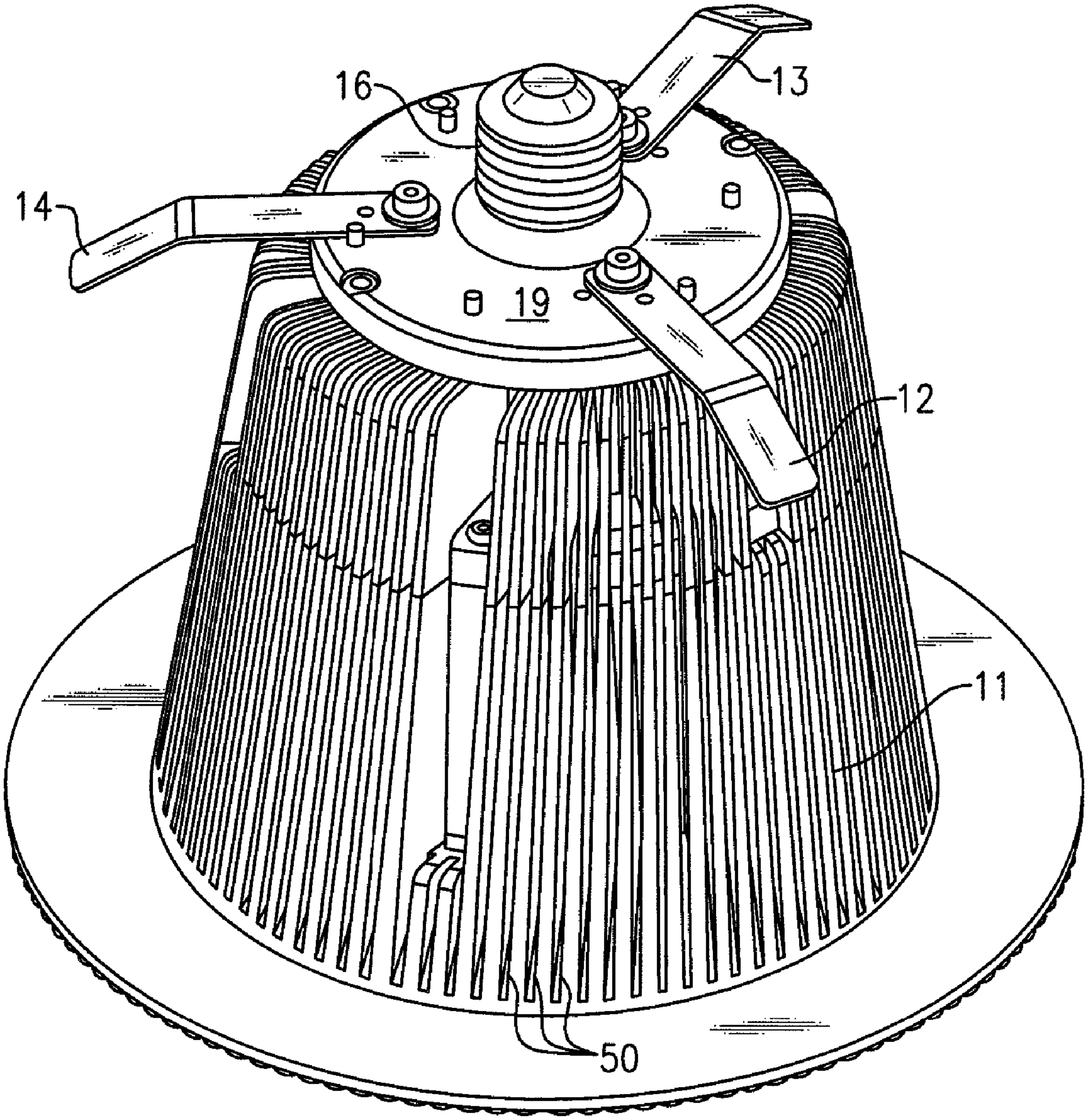
FIG. 5 is a perspective view of the lighting device depicted in FIG. 1, with the lighting device housing and the ceiling not shown.

Referring now to FIG. 4, the lighting device 10 further comprises a first stop element 46 mounted on the light engine housing 11, the first stop element 46 being shaped and positioned such that the first stop element 46 prevents the first mounting clip 12 from rotating 360 degrees about the first pivot axis 18. The first stop element 46 protrudes from the mounting clip surface 19 in a direction substantially perpendicular to the mounting clip surface 19.

Still referring to FIG. 4, the lighting device 10 further comprises a second stop element 47 mounted on the light engine housing 11, the second stop element 47 being shaped and positioned such that the second stop element 47 inhibits the first mounting clip 12 from rotating from a position between the first stop element 46 and the second stop element 47, past the second stop element 47 to a position which is not between the first stop element 46 and the second stop element 47. In other words, in order to rotate the light engine housing 11 such that the first mounting clip 12 passes over the second stop element 47 (e.g., in order to remove the light engine housing 11 from the lighting device housing 15 to service the light engine housing), it is necessary for the person handling the light engine housing 11 to "really mean to" cause such action. The second stop element 47 protrudes from the mounting clip surface 19 in a direction substantially perpendicular to the mounting clip surface 19, and in FIG. 4, the first mounting clip 12 is in the third position, i.e., is positioned between the first stop element 46 and the second stop element 47.

The lighting device also includes stop elements (analogous to the stop elements 46 and 47) for the second and third mounting clips 13 and 14.

The lighting device 10 also includes a diffuser 49.

The exterior surface of the light engine housing has a plurality of fins 50 (most easily seen in FIGS. 3 and 5) to assist in heat dissipation from the light engine housing.

Figure 7:
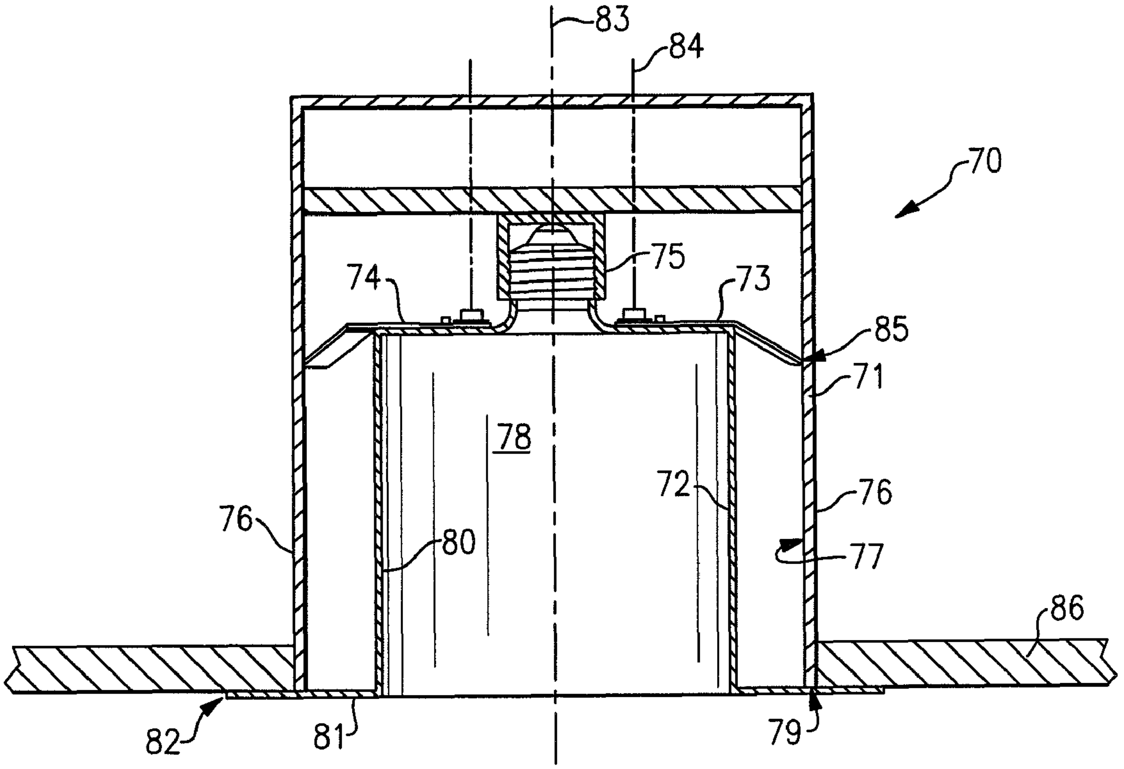
FIG. 7 is a sectional view of a second embodiment of a lighting device in accordance with the present inventive subject matter.

FIG. 7 depicts a second embodiment of a lighting device in accordance with the present inventive subject matter. Referring to FIG. 7, there is shown a lighting device 70 which comprises a lighting device housing 71, a trim element 72, a first mounting clip 73 and a second mounting clip 74.

The lighting device housing 71 comprises an electrical receptacle 75 (in the form of an Edison socket) and a sidewall 76 having an internal surface 77, the internal surface 77 defining an internal space 78, the sidewall 76 terminating in a sidewall end region 79.

The trim element 72 comprises a first portion 80 and a second portion 81, the first portion 80 of the trim element 72 being positioned within the internal space 78, the second portion 81 of the trim element 72 extending beyond the internal space 78. The second portion 81 of the trim element comprises a second portion end region 82 which is positioned farther from an axis 83 of the internal surface 77 than the sidewall end region 79.

The first mounting clip 73 is mounted pivotally about a first pivot axis 84 on the trim element 72. The first mounting clip 73 has a first mounting clip first end region 85 which is spaced from the first pivot axis 84.

The first mounting clip 73 is pivotable about the first pivot axis 84 to a number of positions, including a first mounting clip first position, where the first mounting clip first end region 85 does not extend beyond a periphery of the trim element 72, to a first mounting clip second position, where the first mounting clip first end region 85 extends beyond a periphery of the trim element 72 and is in contact with the internal surface 77 of the lighting device housing 71, such that if the first mounting clip is in the first mounting clip second position and then the trim element is rotated in a counterclockwise direction (viewed from below in the orientation depicted in FIG. 7) about the axis 83 of the internal surface 77, as a result of the contact between the first mounting clip first end region 85 and the lighting device housing 71, the first mounting clip 73 will pivot relative to the first pivot axis 84 to a first mounting clip third position, where the first mounting clip 73 engages the lighting device housing 71 such that the trim element 72 is biased in a direction in which the second portion 81 of the trim element 72 is biased upward (in the orientation depicted in FIG. 7) toward the sidewall end region 79 and the ceiling 86.

The shape and size of each of the first and second mounting clips 73, 74 are similar to those of the mounting clips 12, 13 and 14 in the first embodiment. The lighting device of the second embodiment further comprises first and second stop elements (not shown in FIG. 7) for each of the mounting clips 73 and 74, shaped and oriented in a manner analogous to the stop elements in the first embodiment.

Figure 8:
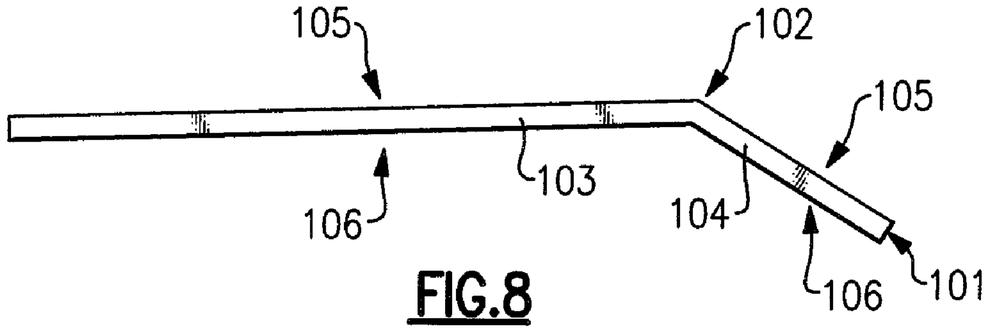
FIG. 8 is a side view of a first embodiment of a mounting clip according to the present inventive subject matter.
Figure 9:
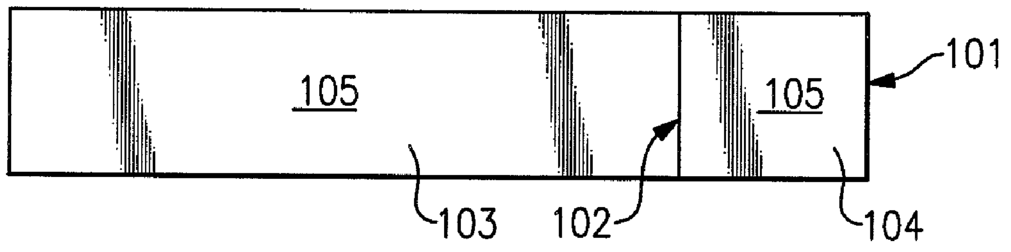
FIG. 9 is a top view of the mounting clip depicted in FIG. 8.

FIGS. 8 and 9 show a first embodiment of a mounting clip according to the present inventive subject matter. FIG. 8 is a side view of the mounting clip, and FIG. 9 is a top view of the mounting clip. The mounting clip includes a first surface 105 and a second surface 106.

The mounting clip has a bent portion 102 between a first portion 103 and a second portion 104, and the mounting clip has a first end region 101 located in the second portion 104. A plane defined by the first surface 105 of the mounting clip in the second portion 104 defines an angle of at least 20 degrees relative to a plane defined by the first surface 105 of the mounting clip in the first portion 103.

Figure 10:
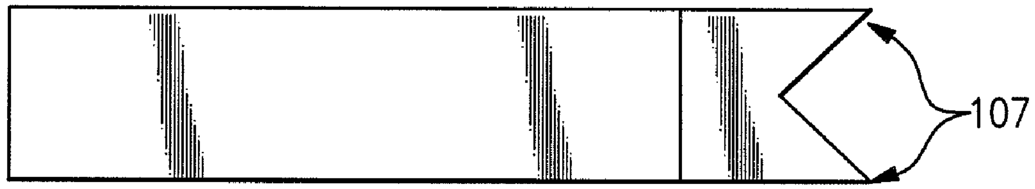
FIG. 10 is a top view of a second embodiment of a mounting clip according to the present inventive subject matter.

FIG. 10 depicts a second embodiment of a mounting clip according to the present inventive subject matter. The second embodiment is similar to the first embodiment (shown in FIGS. 8 and 9), except that in the second embodiment, the first end region 107 of the mounting clip is sharpened. As shown in FIG. 10, the first end region 107 of the mounting clip is sharpened by being V-shaped. The side view of the mounting clip depicted in FIG. 10 would be similar to the view depicted in FIG. 8.

Figure 11:
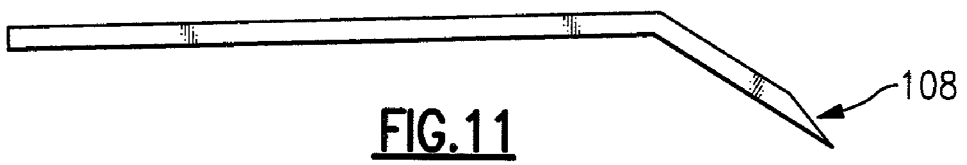
FIG. 11 is a side view of a third embodiment of a mounting clip according to the present inventive subject matter.
Figure 12:
FIG. 12 is a top view of the mounting clip depicted in FIG. 11.

FIGS. 11 and 12 depict a third embodiment of a mounting clip according to the present inventive subject matter. The third embodiment is similar to the first embodiment (shown in FIGS. 8 and 9), except that in the third embodiment, the first end region 108 of the mounting clip is sharpened. As shown in FIG. 11, the first end region 108 of the mounting clip is sharpened by tapering in thickness.

Figure 13:
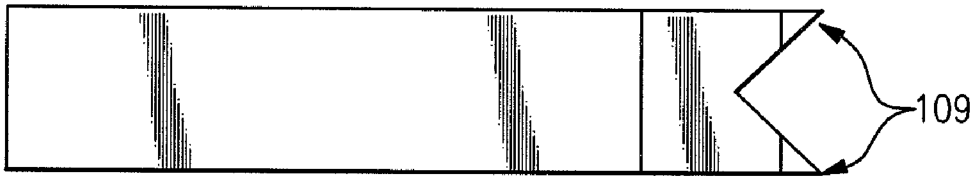
FIG. 13 is a top view of a fourth embodiment of a mounting clip according to the present inventive subject matter.

FIG. 13 depicts a fourth embodiment of a mounting clip according to the present inventive subject matter. The fourth embodiment is similar to the third embodiment (shown in FIGS. 11 and 12), except that in the fourth embodiment, the first end region 109 of the mounting clip is additionally sharpened, in that the first end region 109 of the mounting clip is V-shaped. The side view of the mounting clip depicted in FIG. 13 would be similar to the view depicted in FIG. 11.

Figure 14:
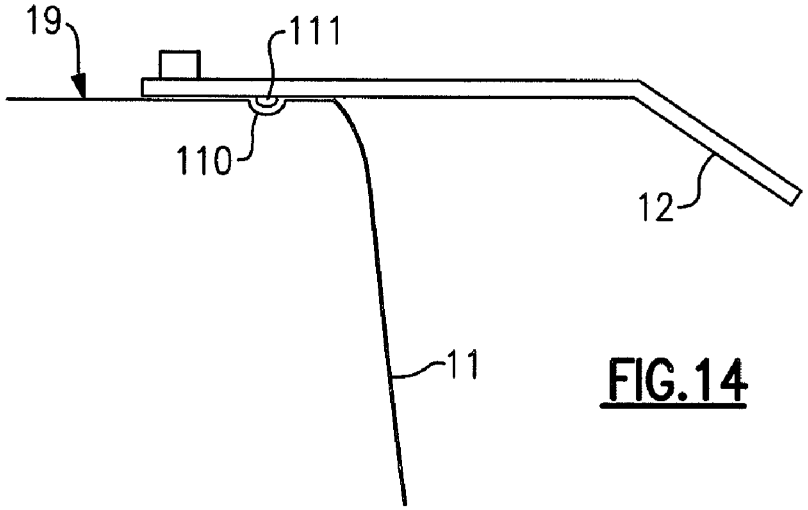
FIG. 14 is a partial side view of the first mounting clip and the mounting clip surface of the embodiment depicted in FIGS. 1-6.

FIG. 14 is a partial side view of the first mounting clip and the mounting clip surface of the embodiment depicted in FIGS. 1-6, and shows a bump/recess combination, in which the first mounting clip 12 has a bump 111 and the mounting clip surface 19 has a recess 110 in which the bump is accommodated.

Figure 15:
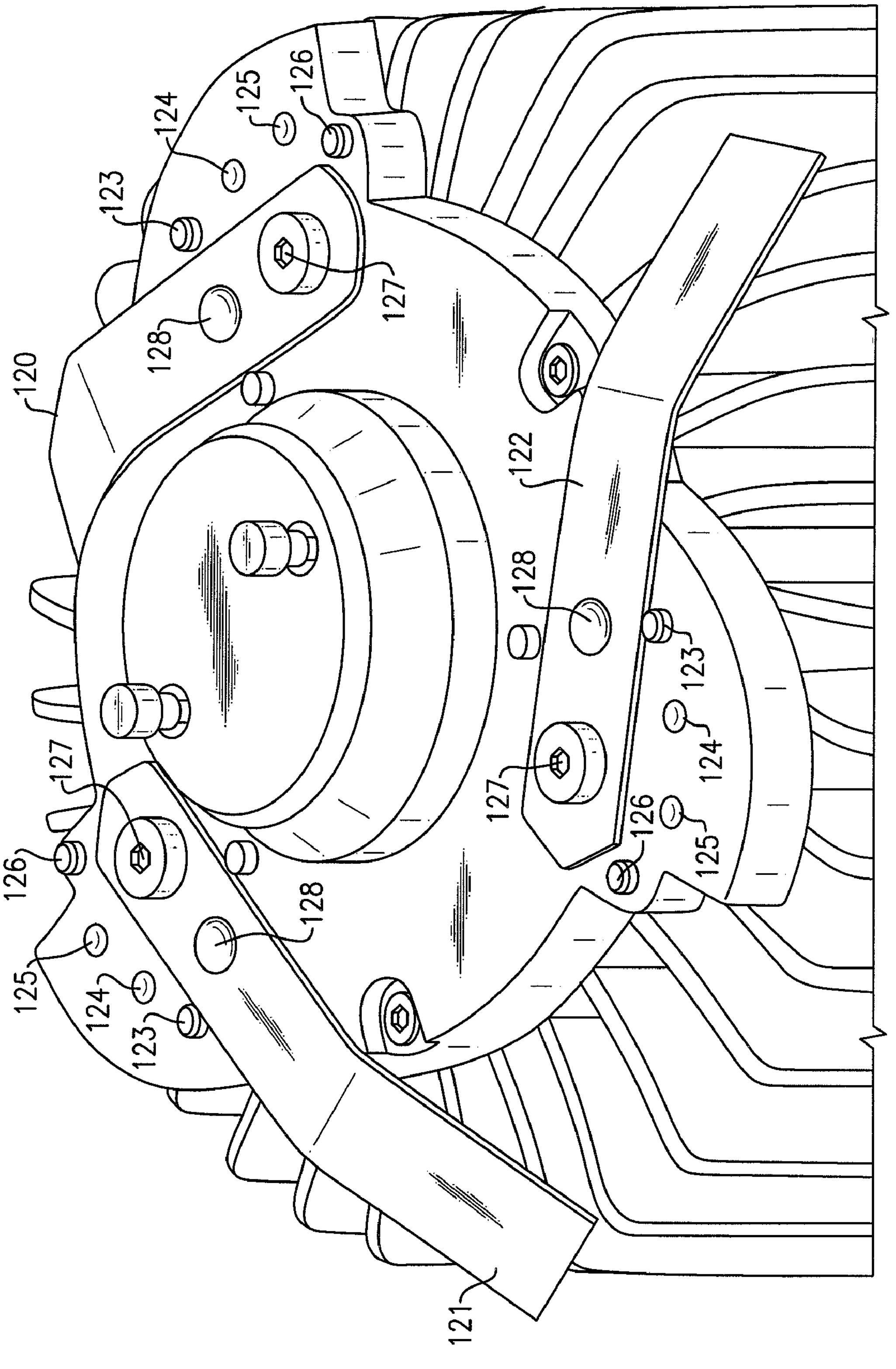
FIG. 15 is a perspective view of a third embodiment of a lighting device in accordance with the present invention.

FIG. 15 is a perspective view of a third embodiment of a lighting device according to the present inventive subject matter. Referring to FIG. 15, there is shown a lighting device housing including three mounting clips 120, 121, 122. For each mounting clip, there is provided a first stop 123, a first protrusion 124, a second protrusion 125 and a second stop 126. Each mounting clip includes a recess 128 (each faces downward). The clips 120, 121, 122 are all in the first position in FIG. 15. Each first stop 123 holds the respective clip in place, i.e., prevents it from moving toward the second position. When it is desired to move the clips 120, 121, 122 into the second position, the clips are bent upward slightly so that they can clear the first stop 123, and they are pivoted clockwise about their respective axes 127 and then released such that their respective recesses 128 rest over the respective first protrusions 124, and the clips are prevented from moving back to the first position by the respective first stops (each is now on the other side of the respective clip). When the lighting device is installed and the clips move to their respective third positions, the clips pivot further clockwise about their axes 127 until the recesses 128 rest over the second protrusions 125, and the clips are prevented from pivoting further (clockwise) by the second stops 126.

Any two or more structural parts of the lighting devices described herein can be integrated. Any structural part of the lighting devices described herein can be provided in two or more parts (which are held together, if necessary or desired). Similarly, any two or more functions can be conducted simultaneously, and/or any function can be conducted in a series of steps.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

The invention claimed is:

1. A lighting device, comprising:

a lighting device housing, said lighting device housing comprising an electrical receptacle and a sidewall having an internal surface, said internal surface of said sidewall defining an internal space, said sidewall terminating in a sidewall end region;

a trim element, said trim element comprising at least first and second portions, said first portion of said trim element being positioned within said internal space, said second portion of said trim element extending beyond said internal space, said second portion of said trim element comprising a second portion end region which is positioned farther from an axis of said internal surface than said sidewall end region; and at least a first mounting clip, said first mounting clip being mounted pivotally about a first pivot axis on said trim element, said first mounting clip having a first mounting clip first end region, said first mounting clip first end region being spaced from said first pivot axis, said first mounting clip being pivotable about said first pivot axis at least from a first mounting clip first position, where said first mounting clip first end region does not extend beyond a periphery of said first portion of said trim element, to a first mounting clip second position, where said first mounting clip first end region extends beyond a periphery of said first portion of said trim element, such that if said first mounting clip is in said first mounting clip second position and then said trim element is rotated in a first direction about said axis of said internal surface, as a result of contact between said first mounting clip first end region and said lighting device housing, said first mounting clip will pivot relative to said first pivot axis to a first mounting clip third position, where said first mounting clip engages said lighting device housing such that said trim element is biased in a direction in which said second portion of said trim element is biased toward said sidewall end region.

2. A lighting device as recited in claim 1, wherein said lighting device housing is substantially cylindrical, and said second portion end region of said trim element extends in a direction which is substantially perpendicular to said axis of said internal surface.

3. A lighting device as recited in claim 1, wherein said lighting device housing is substantially conical, and said second portion end region of said trim element extends in a direction which is substantially perpendicular to said axis of said internal surface.

4. A lighting device as recited in claim 1, wherein said lighting device housing is substantially frustoconical, and said second portion end region of said trim element extends in a direction which is substantially perpendicular to said axis of said internal surface.

5. A lighting device as recited in claim 1, wherein said lighting device further comprises:

a second mounting clip, said second mounting clip being mounted pivotally about a second pivot axis on said trim element, said second mounting clip having a second mounting clip first end region, said second mounting clip first end region being spaced from said second pivot axis; and at least a third mounting clip, said third mounting clip being mounted pivotally about a third pivot axis on said trim element, said third mounting clip having a third mounting clip first end region, said third mounting clip first end region being spaced from said third pivot axis.

6. A lighting device as recited in claim 1, wherein said first mounting clip first end region is sharpened.

7. A lighting device as recited in claim 1, wherein said electrical receptacle is an Edison socket.

8. A lighting device as recited in claim 1, wherein said first mounting clip first end region is spaced from said first pivot axis by a distance which is at least three times a minimum dimension of said first mounting clip in a first plane which is perpendicular to said first pivot axis.

9. A lighting device as recited in claim 1, wherein said first mounting clip has at least one bent portion between a first mounting clip first portion and a first mounting clip second portion, said first mounting clip first end region being located in said first mounting clip second portion, a second plane defined by at least two points on a first surface of said first mounting clip in said bent portion and a point on said first surface of said first mounting clip in said first mounting clip first end region defining an angle of at least 10 degrees relative to a first plane which is perpendicular to said first pivot axis.

10. A lighting device as recited in claim 1, further comprising at least a first stop element mounted on said trim element, said first stop element being shaped and positioned such that said first stop element prevents said first mounting clip from rotating 360 degrees about said first pivot axis.

11. A lighting device as recited in claim 10, wherein said first stop element protrudes from said trim element in a direction substantially perpendicular to a mounting clip surface of said trim element.

12. A lighting device as recited in claim 10, further comprising at least a second stop element mounted on said trim element, said second stop element being shaped and positioned such that said second stop element inhibits said first mounting clip from rotating from a position between said first stop element and said second stop element past said second stop element to a position which is not between said first stop element and said second stop element.

13. A lighting device as recited in claim 10, further comprising at least a second stop element mounted on said trim element, said second stop element protruding from a mounting clip surface of said trim element in a direction substantially perpendicular to said mounting clip surface, said first mounting clip being positioned between said first stop element and said second stop element.

14. A lighting device as recited in claim 1, further comprising at least a first stop element mounted on said trim element, said first stop element being shaped and positioned such that said first stop element prevents said first mounting clip from rotating beyond a position where said first mounting clip first end region is a maximum distance from said trim element.

15. A lighting device as recited in claim 14, wherein said first stop element protrudes from said trim element in a direction substantially perpendicular to a mounting clip surface of said trim element.

16. A lighting device as recited in claim 14, further comprising at least a second stop element mounted on said trim element, said second stop element being shaped and positioned such that said second stop element inhibits said first mounting clip from rotating from a position between said first stop element and said second stop element past said second stop element to a position which is not between said first stop element and said second stop element.

17. A lighting device as recited in claim 14, further comprising at least a second stop element mounted on said trim element, said second stop element protruding from a mounting clip surface of said trim element in a direction substantially perpendicular to said mounting clip surface, said first mounting clip being positioned between said first stop element and said second stop element.

18. A lighting device comprising:

a light engine housing, said light engine housing comprising an electrical connection region, said electrical connection region being engageable in an electrical receptacle;

at least a first mounting clip, said first mounting clip being mounted pivotally about a first pivot axis on a mounting clip surface of said light engine housing, said first mounting clip having a first mounting clip first end region, said first mounting clip first end region being spaced from said first pivot axis; and a lighting device housing, said lighting device housing comprising a sidewall having an internal surface, said sidewall terminating in a sidewall end region;

said first mounting clip being pivotable about said first pivot axis at least from a first mounting clip first position, where said first mounting clip first end region does not extend beyond a periphery of said light engine housing, to a first mounting clip second position, where said first mounting clip first end region extends beyond a periphery of said light engine housing, such that if said first mounting clip is in said first mounting clip second position and then said light engine housing is rotated in a first direction about an axis of said internal surface, as a result of contact between said first mounting clip first end region and said lighting device housing, said first mounting clip will pivot relative to said first pivot axis to a first mounting clip third position, where said first mounting clip engages said lighting device housing such that said mounting clip surface is biased in a direction away from said sidewall end region.

19. A lighting device as recited in claim 18, further comprising at least a first cam element mounted on a surface of said lighting device housing, said cam element being shaped and positioned such that said light engine housing can be rotated about said axis of said internal surface such that said first mounting clip first end region is deflected by said first cam element in a direction along said axis of said internal surface.

20. A lighting device as recited in claim 18, wherein:

said sidewall defines an internal space, and said lighting device further comprises a flange portion, said light engine housing being positioned within said internal space, said flange portion extending from said light engine housing beyond said internal space, said flange portion comprising a flange portion end region which is positioned farther from said axis of said internal surface than said sidewall.

21. A lighting device as recited in claim 20, wherein said lighting device housing is substantially cylindrical, and said flange portion end region extends in a direction which is substantially perpendicular to said axis of said internal surface.

22. A lighting device as recited in claim 20, wherein said lighting device housing is substantially conical, and said flange portion end region extends in a direction which is substantially perpendicular to said axis of said internal surface.

23. A lighting device as recited in claim 20, wherein said lighting device housing is substantially frustoconical, and said flange portion end region extends in a direction which is substantially perpendicular to said axis of said internal surface.

24. A lighting device as recited in claim 18, further comprising:

at least a first solid state light emitter; and at least a first ballast element, at least a first region of said first ballast element being electrically connected to said electrical connection region, at least a second region of said first ballast element being electrically connected to said first solid state light emitter, said first ballast element comprising circuitry which, if power of a first voltage is supplied to said first region of said first ballast element, outputs power of a second voltage, and supplies said power of said second voltage to said first solid state light emitter.

25. A lighting device as recited in claim 18, wherein said lighting device further comprises:

a second mounting clip, said second mounting clip being mounted pivotally about a second pivot axis on said mounting clip surface of said light engine housing, said second mounting clip having a second mounting clip first end region, said second mounting clip first end region being spaced from said second pivot axis; and at least a third mounting clip, said third mounting clip being mounted pivotally about a third pivot axis on said mounting clip surface of said light engine housing, said third mounting clip having a third mounting clip first end region, said third mounting clip first end region being spaced from said third pivot axis.

26. A lighting device as recited in claim 18, wherein said first mounting clip first end region is sharpened.

27. A lighting device as recited in claim 18, wherein said electrical connection region comprises a screw-threaded region, said screw-threaded region being receivable in an Edison socket.

28. A lighting device as recited in claim 18, wherein said first mounting clip first end region is spaced from said first pivot axis by a distance which is at least three times a minimum dimension of said first mounting clip in a first plane which is perpendicular to said first pivot axis.

29. A lighting device as recited in claim 18, wherein said first mounting clip has at least one bent portion between a first mounting clip first portion and a first mounting clip second portion, said first mounting clip first end region being located in said first mounting clip second portion, a second plane defined by at least two points on a first surface of said first mounting clip in said bent portion and a point on said first surface of said first mounting clip in said first mounting clip first end region defining an angle of at least 10 degrees relative to a first plane which is perpendicular to said first pivot axis.

30. A lighting device as recited in claim 18, further comprising at least a first stop element mounted on said light engine housing, said first stop element being shaped and positioned such that said first stop element prevents said first mounting clip from rotating 360 degrees about said first pivot axis.

31. A lighting device as recited in claim 30, wherein said first stop element protrudes from said mounting clip surface in a direction substantially perpendicular to said mounting clip surface.

32. A lighting device as recited in claim 30, further comprising at least a second stop element mounted on said light engine housing, said second stop element being shaped and positioned such that said second stop element inhibits said first mounting clip from rotating from a position between said first stop element and said second stop element past said second stop element to a position which is not between said first stop element and said second stop element.

33. A lighting device as recited in claim 30, further comprising at least a second stop element mounted on said light engine housing, said second stop element protruding from said mounting clip surface in a direction substantially perpendicular to said mounting clip surface, said first mounting clip being positioned between said first stop element and said second stop element.

34. A lighting device as recited in claim 18, further comprising at least a first stop element mounted on said light engine housing, said first stop element being shaped and positioned such that said first stop element prevents said first mounting clip from rotating beyond a position where said first mounting clip first end region is a maximum distance from said light engine housing.

35. A lighting device as recited in claim 34, wherein said first stop element protrudes from said mounting clip surface in a direction substantially perpendicular to said mounting clip surface.

36. A lighting device as recited in claim 34, further comprising at least a second stop element mounted on said light engine housing, said second stop element being shaped and positioned such that said second stop element inhibits said first mounting clip from rotating from a position between said first stop element and said second stop element past said second stop element to a position which is not between said first stop element and said second stop element.

37. A lighting device as recited in claim 34, further comprising at least a second stop element mounted on said light engine housing, said second stop element protruding from said mounting clip surface in a direction substantially perpendicular to said mounting clip surface, said first mounting clip being positioned between said first stop element and said second stop element.

38. A method of installing a light engine housing in a lighting device housing, said method comprising:

positioning a light engine housing such that at least a portion of said light engine housing is within an internal space defined by a sidewall of a lighting device housing, said light engine housing comprising an electrical connection region, said electrical connection region being engageable in an electrical receptacle; and rotating said light engine housing relative to said lighting device housing, said rotating causing at least a first mounting clip which is mounted pivotally about a first pivot axis on a mounting clip surface of said light engine housing to pivot about said first pivot axis such that a first mounting clip first end region of said first mounting clip, said first mounting clip first end region being spaced from said first pivot axis, engages an internal surface of said lighting device housing, and biases said mounting clip in a direction away from a sidewall end region of said sidewall.

39. A method as recited in claim 38, further comprising connecting said electrical connection region to an electrical receptacle prior to said rotating said light engine housing relative to said lighting device housing.

40. A method as recited in claim 39, wherein said electrical receptacle is an Edison socket.

41. A method as recited in claim 38, further comprising positioning said first mounting clip in a first mounting clip second position, where said first mounting clip first end region extends beyond a periphery of said light engine housing, prior to said positioning said light engine housing such that at least a portion of said light engine housing is within said internal space.

42. A method as recited in claim 38, wherein at least a first cam element is mounted on a surface of said lighting device housing, said cam element being shaped and positioned such that when said light engine housing is rotated relative to said lighting device housing, said first mounting clip first end region is deflected by said first cam element in a direction along an axis of said internal surface.

43. A method as recited in claim 38, wherein during said rotating said light engine housing relative to said lighting device housing, said first mounting clip is rotated about said first pivot axis to a position which is between a first stop element mounted on said light engine housing and a second stop element mounted on said light engine housing, and said first mounting clip is prevented from rotating about said first pivot axis past said first stop element by contacting said first stop element.

44. A method of installing a trim element in a lighting device housing, said method comprising:

positioning a trim element such that at a first portion of said trim element is within an internal space defined by an internal surface of a sidewall of a lighting device housing; and rotating said trim element relative to said lighting device housing, said lighting device housing comprising an electrical receptacle, said sidewall terminating in a sidewall end region, said trim element comprising said first portion and at least a second portion, said second portion of said trim element extending beyond said internal space, said second portion of said trim element comprising a second portion end region which is positioned farther from an axis of said internal surface than said sidewall end region, said rotating causing at least a first mounting clip which is mounted pivotally about a first pivot axis on a mounting clip surface of said trim element to pivot about said first pivot axis such that a first mounting clip first end region of said first mounting clip, said first mounting clip first end region being spaced from said first pivot axis, engages an internal surface of said lighting device housing, and biases said trim element in a direction in which said second portion of said trim element is biased toward said sidewall end region.

45. A method as recited in claim 44, wherein said electrical receptacle is an Edison socket.

46. A method as recited in claim 44, further comprising positioning said first mounting clip in a first mounting clip second position, where said first mounting clip first end region extends beyond a periphery of said first portion of said trim element, prior to said positioning said trim element such that said first portion of said trim element is within said internal space.

47. A method as recited in claim 44, wherein at least a first cam element is mounted on a surface of said lighting device housing, said cam element being shaped and positioned such that when said trim element is rotated relative to said lighting device housing, said first mounting clip first end region is deflected by said first cam element in a direction along said axis of said internal surface.

48. A method as recited in claim 44, wherein during said rotating said trim element relative to said lighting device housing, said first mounting clip is rotated about said first pivot axis to a position which is between a first stop element mounted on said trim element and a second stop element mounted on said trim element, and said first mounting clip is prevented from rotating about said first pivot axis past said first stop element by contacting said first stop element.

49. A lighting device, comprising:

a trim element, said trim element comprising at least first and second portions, said second portion of said trim element comprising a second portion end region which is positioned farther from an axis of said first portion of said trim element than any part of said first portion of said trim element; and at least a first mounting clip, said first mounting clip being mounted pivotally about a first pivot axis on said trim element, said first mounting clip having a first mounting clip first end region, said first mounting clip first end region being spaced from said first pivot axis, said first mounting clip being pivotable about said first pivot axis at least from a first mounting clip first position, where said first mounting clip first end region does not extend beyond a periphery of said first portion of said trim element, to a first mounting clip second position, where said first mounting clip first end region extends beyond a periphery of said first portion of said trim element, such that if said trim element is placed within a housing with said first mounting clip in said first mounting clip second position and in contact with an internal surface of said housing, and then said trim element is rotated in a first direction about said axis of said trim element, said first mounting clip will pivot relative to said first pivot axis to a first mounting clip third position, where said first mounting clip engages said housing such that said second portion of said trim element is biased toward said housing.

50. A lighting device as recited in claim 49, wherein said part of said first portion of said trim element is substantially cylindrical, and said second portion of said trim element extends in a direction which is substantially perpendicular to said axis of said first portion of said trim element.

51. A lighting device as recited in claim 49, wherein said part of said first portion of said trim element is substantially conical, and said second portion of said trim element extends in a direction which is substantially perpendicular to said axis of said first portion of said trim element.

52. A lighting device as recited in claim 49, wherein said part of said first portion of said trim element is substantially frustoconical, and said second portion of said trim element extends in a direction which is substantially perpendicular to said axis of said first portion of said trim element.

53. A lighting device as recited in claim 49, wherein said lighting device further comprises:

a second mounting clip, said second mounting clip being mounted pivotally about a second pivot axis on said trim element, said second mounting clip having a second mounting clip first end region, said second mounting clip first end region being spaced from said second pivot axis; and at least a third mounting clip, said third mounting clip being mounted pivotally about a third pivot axis on said trim element, said third mounting clip having a third mounting clip first end region, said third mounting clip first end region being spaced from said third pivot axis.

54. A lighting device as recited in claim 49, further comprising at least a first stop element mounted on said trim element, said first stop element being shaped and positioned such that said first stop element prevents said first mounting clip from rotating 360 degrees about said first pivot axis.

55. A lighting device as recited in claim 54, wherein said first stop element protrudes from said trim element in a direction substantially perpendicular to a mounting clip surface of said trim element.

56. A lighting device as recited in claim 55, further comprising at least a second stop element mounted on said trim element, said second stop element being shaped and positioned such that said second stop element inhibits said first mounting clip from rotating from a position between said first stop element and said second stop element past said second stop element to a position which is not between said first stop element and said second stop element.

* * * * *